(12) United States Patent
Nakatsuka

(10) Patent No.: US 6,985,860 B2
(45) Date of Patent: Jan. 10, 2006

(54) MODEL ADAPTATION APPARATUS, MODEL ADAPTATION METHOD, STORAGE MEDIUM, AND PATTERN RECOGNITION APPARATUS

(75) Inventor: Hironaga Nakatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 582 days.

(21) Appl. No.: 09/942,896

(22) Filed: Aug. 30, 2001

(65) Prior Publication Data

US 2002/0062212 A1    May 23, 2002

(30) Foreign Application Priority Data

Aug. 31, 2000 (JP) ............................. 2000-264035

(51) Int. Cl.
*G10L 15/06* (2006.01)
*G10L 15/20* (2006.01)
*G10L 15/08* (2006.01)

(52) U.S. Cl. ............... 704/244; 704/233; 704/236

(58) Field of Classification Search ............... 704/244, 704/231, 233, 243, 236–240
See application file for complete search history.

(56) References Cited

U.S. PATENT DOCUMENTS

| | | | | |
|---|---|---|---|---|
| 5,572,623 A | * | 11/1996 | Pastor | 704/233 |
| 5,793,891 A | * | 8/1998 | Takahashi et al. | 382/228 |
| 5,835,890 A | * | 11/1998 | Matsui et al. | 704/255 |
| 5,930,753 A | * | 7/1999 | Potamianos et al. | 704/256 |
| 5,978,760 A | * | 11/1999 | Rao et al. | 704/226 |
| 6,026,359 A | * | 2/2000 | Yamaguchi et al. | 704/256 |
| 6,078,884 A | * | 6/2000 | Downey | 704/243 |
| 6,108,628 A | * | 8/2000 | Komori et al. | 704/256 |
| 6,188,982 B1 | * | 2/2001 | Chiang | 704/256 |
| 6,205,426 B1 | * | 3/2001 | Nguyen et al. | 704/255 |
| 6,418,411 B1 | * | 7/2002 | Gong | 704/256 |
| 2001/0025276 A1 | * | 9/2001 | Pao | 706/14 |

OTHER PUBLICATIONS

McKinley et al., "Noise Model Adaptation in Model Based Speech Enhancement", ICASSP-96, vol. 2, Iss., May 7-10, 1996, pp. 633-636 vol. 2.*

* cited by examiner

*Primary Examiner*—Susan McFadden
*Assistant Examiner*—Brian L. Albertalli
(74) *Attorney, Agent, or Firm*—Frommer Lawrence & Haug LLP; William S. Frommer

(57) ABSTRACT

To achieve an improvement in recognition performance, a non-speech acoustic model correction unit adapts a non-speech acoustic model representing a non-speech state using input data observed during an interval immediately before a speech recognition interval during which speech recognition is performed, by means of one of the most likelihood method, the complex statistic method, and the minimum distance-maximum separation theorem.

1 Claim, 16 Drawing Sheets

MODEL ADAPTATION APPARATUS, MODEL ADAPTATION METHOD, STORAGE MEDIUM, AND PATTERN RECOGNITION APPARATUS

BACKGROUND OF THE INVENTION

1. Field of the Invention

The present invention relates to a model adaptation apparatus, a model adaptation method, a storage medium, and a pattern recognition apparatus, and more particularly, to a model adaptation apparatus, a model adaptation method, a storage medium, and a pattern recognition apparatus, which are suitable for use in speech recognition or the like.

2. Description of the Related Art

Methods of recognizing a word or the like uttered in a noisy environment are known. Representative examples thereof include a PMC (Parallel Model Combination) method, a SS/NSS (Spectral Subtraction/Nonlinear Spectral Subtraction) method, and a SFE (Stochastic Feature Extraction) method.

The advantage of the PMC method is that information of ambient noise is directly incorporated in an acoustic model and thus high recognition performance can be achieved. However, the disadvantage is high calculation cost. That is, in the PMC method, to perform complicated calculation, a large-scale apparatus and a long processing time are needed. On the other hand, in the SS/NSS method, ambient noise is removed when a feature value of voice data is extracted. Therefore, the SS/NSS method needs lower calculation cost than is needed in the PMC method and thus this method is now widely used in the art. In the SFE method, although ambient noise is removed when a feature value of voice data is extracted, as in the SS/NSS method, the extracted feature value is represented by a probability distribution. Thus, the SFE method differs from the SS/NSS method or the PMC method in that the SFE method extracts the feature value of voice in the form of a distribution in the feature space while the SS/NSS method and the PMC method extract the feature value of voice in the form of a point in the feature space.

In any method described above, after extracting the feature value of the voice, it is determined which one of acoustic models corresponding to registered words or the like best matches the feature value, and a word corresponding to the best matching acoustic model is employed and output as a recognition result.

A detailed description of the SFE method may be found, for example, in Japanese Unexamined Patent Application Publication No. 11-133992 (Japanese Patent Application No. 9-300979) which has been filed by the applicant for the present invention. Discussions on the performance of the PMC method, the SS/NSS method, and the SFE method may be found, for example, in the following papers: H. Pao, H. Honda, K. Minamino, M. Omote, H. Ogawa and N. Iwahashi, "Stochastic Feature Extraction for Improving Noise Robustness in Speech Recognition", Proceedings of the 8th Sony Research Forum, SRF98-234, pp.9–14, October 1998; N. Iwahashi, H. Pa, H. Honda, K. Minamin and M. Omote, "Stochastic Features for Noise Robust in Speech Recognition", ICASSP'98 Proceedings, pp.633–636, May, 1998; N. Iwahashi, H. Pao (presented), H. Honda, K. Minamin and M. Omote, "Noise Robust Speech Recognition Using Stochastic Representation of Features", ASJ'98—Spring Proceedings, pp.91–92, March, 1998; N. Iwahashi, H. Pao, H. Honda, K. Minamino and M. Omote, "Stochastic Representation of Feature for Noise Robust Speech Recognition", Technical Report of IEICE, pp.19–24, SP97-97(1998–01).

A problem with the above-described SFE method or similar methods is that degradation in recognition performance can occur because ambient noise is not directly reflected in speech recognition, that is, because information of ambient noise is not directly incorporated in an acoustic model.

Furthermore, because information of ambient noise is not directly incorporated in the acoustic model, degradation in the recognition performance becomes more serious as the time period from the start of speech recognition operation to the start of utterance becomes longer.

SUMMARY OF THE INVENTION

In view of the above, it is an object of the present invention to provide a technique in which an acoustic model is corrected using information of ambient noise thereby preventing the recognition performance from being degraded as the time period from the start of speech recognition operation to the start of utterance becomes longer.

According to an aspect of the present invention, there is provided a model adaptation apparatus comprising data extraction means for extracting input data corresponding to a predetermined model, observed during a predetermined interval, and then outputting the extracted data; and a model adaptation means for adapting the predetermined model using the data extracted during the predetermined interval by means of one of the most likelihood method, the complex statistic method, and the minimum distance-maximum separation theorem.

According to another aspect of the present invention, there is provided a model adaptation method comprising the steps of extracting input data corresponding to a predetermined model, observed during a predetermined interval, and then outputting the extracted data; and adapting the predetermined model using the data extracted during the predetermined interval by means of one of the most likelihood method, the complex statistic method, and the minimum distance-maximum separation theorem.

According to still another aspect of the present invention, there is provided a storage medium which stores a program comprising the steps of extracting input data corresponding to a predetermined model, observed during a predetermined interval, and then outputting the extracted data; and adapting the predetermined model using the data extracted during the predetermined interval by means of one of the most likelihood method, the complex statistic method, and the minimum distance-maximum separation theorem.

According to still another aspect of the present invention, there is provided a pattern recognition apparatus comprising: data extraction means for extracting input data corresponding to a predetermined model, observed during a predetermined interval, and then outputting the extracted data; and a model adaptation means for adapting the predetermined model using the data extracted during the predetermined interval by means of one of the most likelihood method, the complex statistic method, and the minimum distance-maximum separation theorem.

In the model adaptation apparatus, the model adaptation method, the store medium, and the pattern recognition apparatus, according to the present invention, as described above, input data corresponding to a predetermined model observed during a predetermined interval is extracted and output as extracted data. The predetermined model is adapted using the data extracted during the predetermined interval by means of one of the most likelihood method, the complex statistic method, and the minimum distance-maximum separation theorem,

DESCRIPTION OF THE PREFERRED EMBODIMENTS

Figure 1:
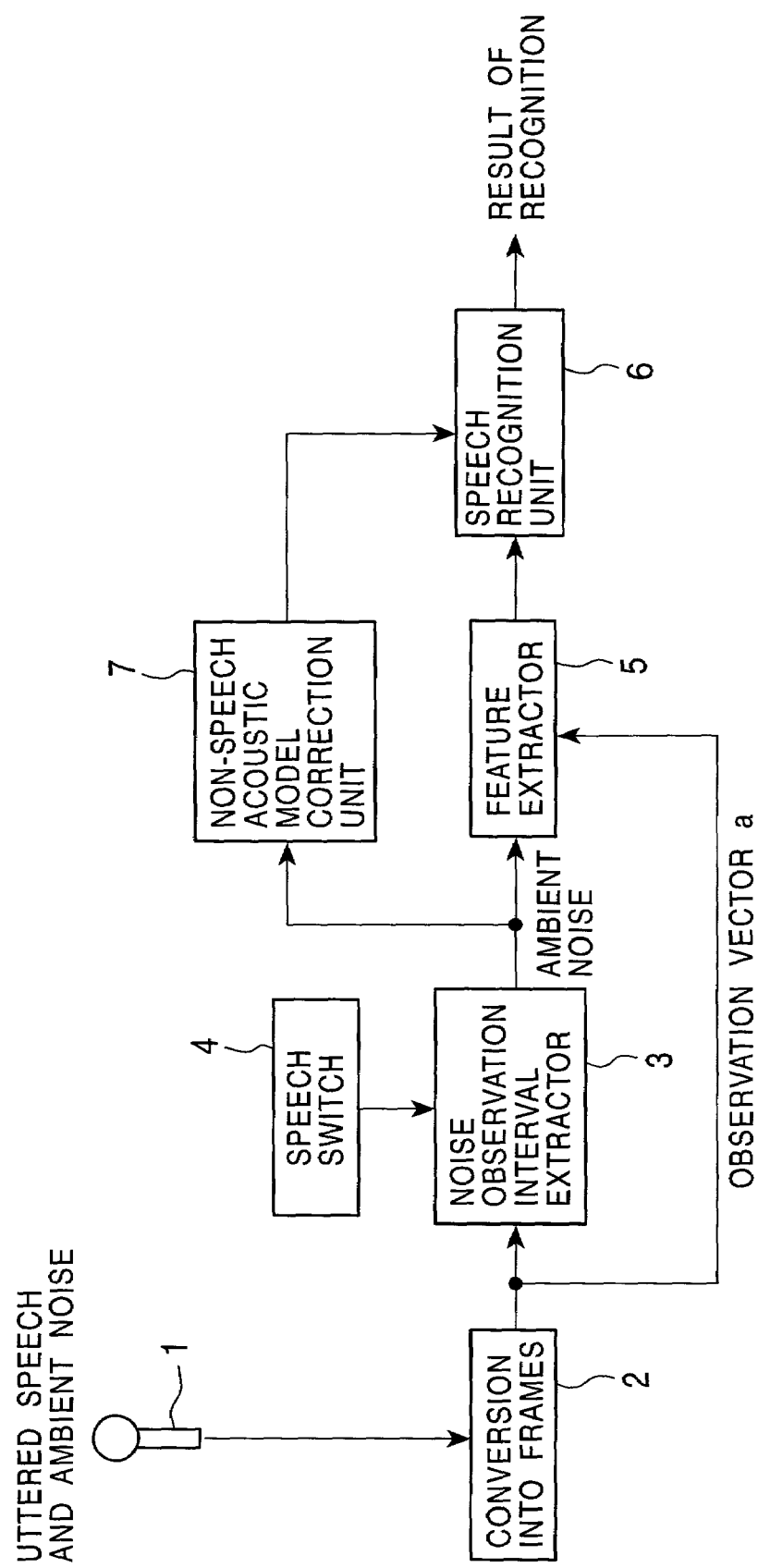
FIG. 1 is a block diagram illustrating an embodiment of a speech recognition apparatus according to the present invention.

FIG. 1 illustrates an embodiment of a speech recognition apparatus according to the present invention.

In this speech recognition apparatus, a microphone 1 detects an uttered voice to be recognized together with ambient noise and outputs the detected voice and ambient noise to a conversion-into-frame unit 2. The conversion-into-frame unit 2 converts the voice data received from the microphone 1 into digital form. Furthermore, the conversion-into-frame unit 2 extracts the digital voice data in predetermined intervals (every 10 ms, for example) and outputs the extracted data in the form of a frame of data. The voice data output in units of frames from the conversion-into-frame unit 2 is supplied, in the form of an observation vector a including as components thereof a time series of voice data of each frame, to a noise observation interval extractor 3 and a feature extractor 5.

Hereinafter, a tth frame of speech data, that is, observation vector, is denoted as a(t).

Figure 2:
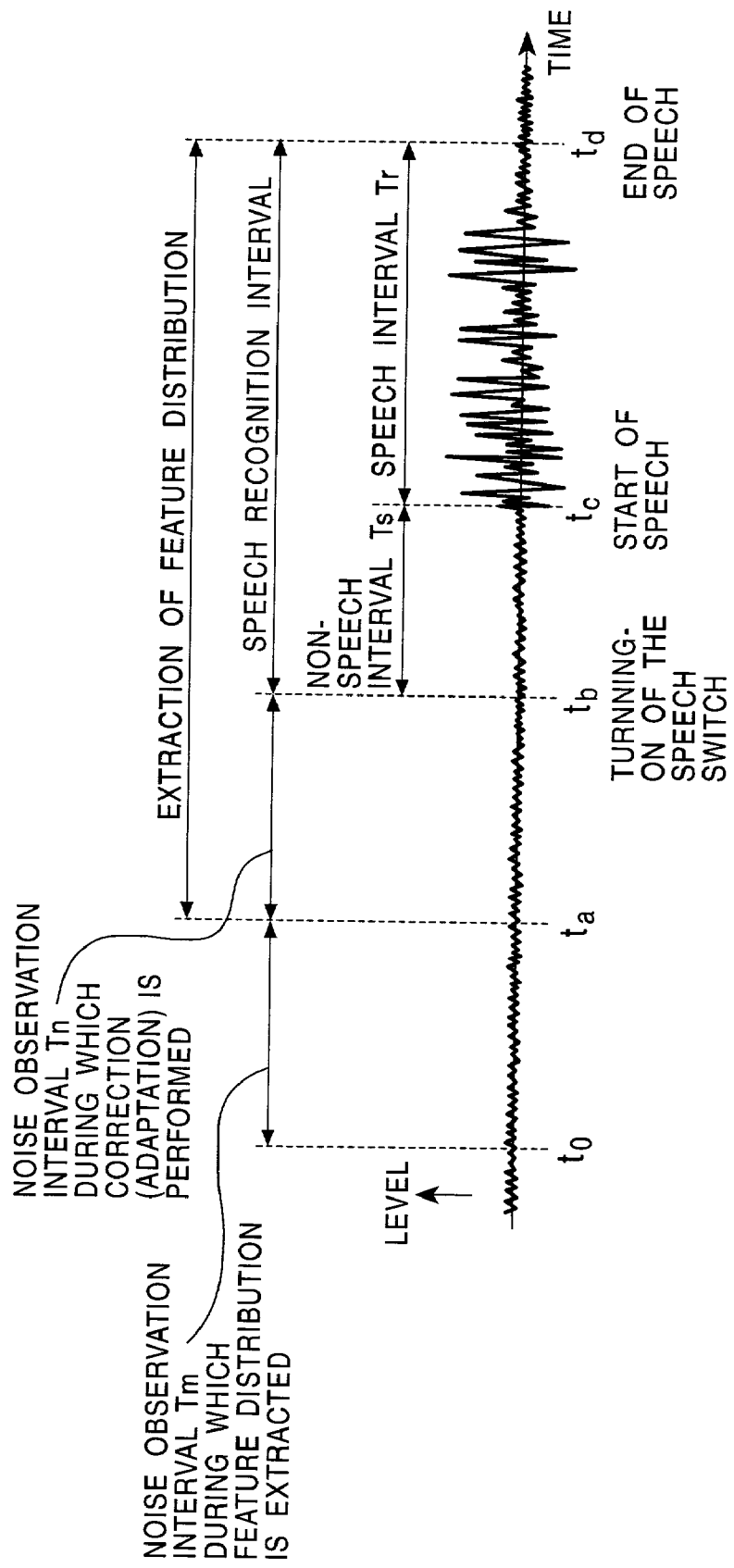
FIG. 2 is a diagram illustrating the operation of a noise observation interval extracctor shown in FIG. 1.

The noise observation interval extractor 3 stores frames of voice data applied from the conversion-into-frame unit 2 into a buffer for a predetermined period of time (corresponding to 2N or more frames). Thereafter, as shown in FIG. 2, a noise observation interval with an end time $t_b$ at which a speech switch 4 is turned on and with a start time $t_0$ 2N frames before the end time $t_b$. An observation vector a for 2N frames is extracted during the noise observation interval and output to the feature extractor 5 and a non-speech acoustic model correction unit 7. In the present embodiment, the noise observation interval is divided into two sub intervals: a noise observation interval Tm during which a feature distribution which will be described later is extracted, and a noise observation interval Tn during which adaptation of the acoustic model is performed. Each of the noise observation intervals Tm and Tn has a length corresponding to N frames. However, it is not necessarily required that the lengths of the noise observation intervals Tm and Tn be equal to each other.

The speech switch 4 is turned on by a user when the user starts speech and is turned off when the speech is ended. Therefore, as can be seen from FIG. 2, before the speech switch 4 is turned on at a time $t_b$, the voice data (in the noise observation interval) does not include uttered speech but includes only ambient noise. An interval from the time $t_b$ at which the speech switch 4 is turned on to a time $t_d$ at which the speech switch 4 is turned off is employed as a speech recognition interval during which voice data is subjected to speech recognition.

On the basis of the voice data which is supplied from the noise observation interval extractor 3 and which includes only ambient noise obtained during the noise observation interval Tm which is the first interval of the two noise observation intervals Tm and Tn, the feature extractor 5 removes the ambient noise from the observation vector a which is supplied from the conversion-into-frame unit 2 during the speech recognition interval starting at $t_b$.

The feature extractor 5 determines the power spectrum of the real voice data (obtained by removing the ambient noise) in the form of the observation vector a by means of, for example, a Fourier transform. The feature extractor 5 then calculates a feature vector y including, as its components, frequency components of the power spectrum. The calculation method of the power spectrum is not limited to those based on the Fourier transform, but the power spectrum may be determined by another method such as a filter bank method.

Thereafter, on the basis of the feature vector y and the ambient noise during the noise observation interval Tm, the feature extractor 5 calculates a parameter Z indicating the distribution, in the space of feature values (feature space), of a feature value which is obtained by mapping the real voice included in the voice data in the form of the observation vector a (hereinafter, such a parameter will be referred to as a feature distribution parameter). The resultant feature distribution parameter Z is supplied to a speech recognition unit 6.

Figure 3:
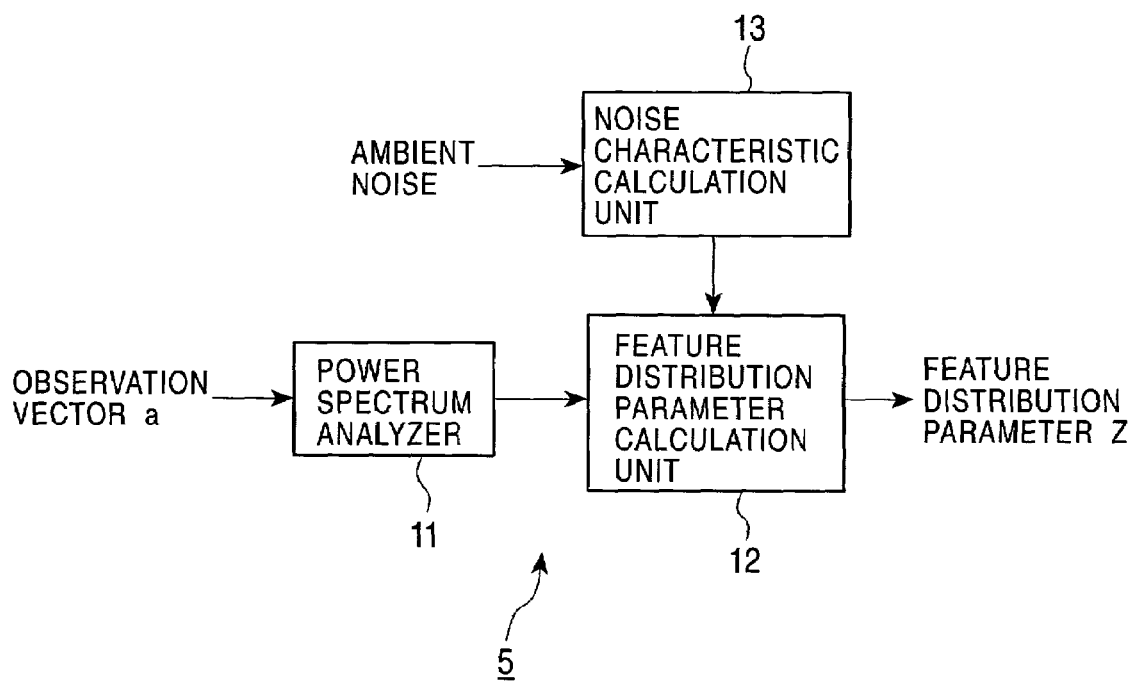
FIG. 3 is a block diagram illustrating an example of a detailed construction of a feature extractor 5 shown in FIG. 1.

FIG. 3 illustrates an example of a detailed construction of the feature extractor 5 shown in FIG. 1. The observation vector a input to the feature extractor 5 from the conversion-into-frame unit 2 is applied to a power spectrum analyzer 11.

In the power spectrum analyzer 11, the observation vector a is subjected to a Fourier transform based on, for example, a FFT (fast Fourier transform) algorithm thereby extracting a feature vector in the form of a power spectrum of a voice. Herein, it is assumed that an observation vector a in the form of one frame of voice data is converted into a feature vector consisting of M components (M-dimensional feature vector).

Herein, a feature vector obtained from a tth frame of observation vector a(t) is denoted by y(t). Furthermore, a spectrum component of real voice of a feature vector y(t) is denoted by x(t) and a spectrum component of ambient noise is denoted by u(t). Thus, the spectrum component of real voice, x(t), is given by the following equation (1).

$$x(t) = y(t) - u(t) \tag{1}$$

Herein, it is assumed that the characteristic of the ambient noise can vary irregularly and it is also assumed that the voice data in the form of an observation vector a(t) consists of a real voice component plus ambient noise.

The ambient noise which is input as voice data to the feature extractor 5 from the noise observation interval extractor 3 during the noise observation interval Tm is applied to a noise characteristic calculation unit 13. The noise characteristic calculation unit 13 determines the characteristic of the ambient noise during the noise observation interval Tm.

Assuming that the distribution of the power spectrum u(t) of the ambient noise during the speech recognition interval is the same as (or similar to) that of the ambient noise during the noise observation interval Tm immediately before the speech recognition interval, and further assuming that the distribution is a normal distribution, the noise characteristic calculation unit 13 calculates the mean value (mean vector) and the variance (variance matrix) (co-variance matrix) of the ambient noise such that the normal distribution is represented by the mean value and the variance.

The mean vector $\mu'$ and the variance matrix $\Sigma'$ can be given by the following equation (2).

$$\mu'(i) = \frac{1}{N} \sum_{t=1}^{N} y(t)(i) \tag{2}$$

$$\sum{}'(i,j) = \frac{1}{N} \sum_{t=1}^{N} (y(t)(i) - \mu'(i))(y(t)(j) - \mu'(j))$$

where $\mu'$(i) denotes an ith component of the mean vector $\mu'$ (i=1, 2, ..., M), y(t)(i) denotes an ith component of a tth frame of feature vector, and $\Sigma'$(i, j) denotes a component in an ith row and a jth column of the variance matrix $\Sigma'$ (j=1, 2, ..., M).

Herein, for simplicity in calculation, the respective components of the feature vector y of the ambient noise are assumed to have no correlation with each other. In this case, the components of the variance matrix $\Sigma'$ become 0 except for diagonal components, as shown below.

$$\Sigma'(i, j) = 0, i \neq j \tag{3}$$

The noise characteristic calculation unit 13 determines, in the above-described manner, the mean vector $\mu'$ and the mean value $\Sigma'$ which define a normal distribution representing the ambient noise characteristic, and supplies the result to a feature distribution parameter calculation unit 12.

The feature vector y of the uttered voice containing ambient noise, output from the power spectrum analyzer 11, is also supplied to the feature distribution parameter calculation unit 12. In the feature distribution parameter calculation unit 12, feature distribution parameters representing the distribution (estimated distribution) of the power spectrum of the real voice are calculated from the feature vector y supplied from the power spectrum analyzer 11 and the ambient noise characteristic supplied from the noise characteristic calculation unit 13.

That is, in the feature distribution parameter calculation unit 12, assuming that the power spectrum of the real voice has a normal distribution, the mean vector $\xi$ and the variance matrix $\psi$ thereof are determined as the feature distribution parameters in accordance with equations (4) to (7) shown below.

$$\xi(t)(i) = E[x(t)(i)] \tag{4}$$

$$= E[y(t)(i) - u(t)(i)]$$

$$= \int_0^{y(t)(i)} (y(t)(i) - u(t)(i)) \frac{P(u(t)(i))}{\int_0^{y(t)(i)} P(u(t)(i)) du(t)(i)} du(t)(i)$$

$$= \frac{y(t)(i) \int_0^{y(t)(i)} P(u(t)(i)) du(t)(i) - \int_0^{y(t)(i)} u(t)(i) P(u(t)(i)) du(t)(i)}{\int_0^{y(t)(i)} P(u(t)(i)) du(t)(i)}$$

$$= y(t)(i) - \frac{\int_0^{y(t)(i)} u(t)(i) P(u(t)(i)) du(t)(i)}{\int_0^{y(t)(i)} P(u(t)(i)) du(t)(i)}$$

$$\Psi(t)(i, j) = V[x(t)(i)] \tag{5}$$

$$= E[(x(t)(i))^2] - (E[x(t)(i)])^2$$

$$(= (E[x(t)(i))^2] - (\xi(t)(i))^2) \text{ for } i = j$$

$$\Psi(t)(i, j) = 0 \text{ for } i \neq j$$

$$E[(x(t)(i))^2] = E[(y(t)(i) - u(t)(i))^2] \tag{6}$$

$$= \int_0^{y(t)(i)} (y(t)(i) - u(t)(i))^2 \frac{P(u(t)(i))}{\int_0^{y(t)(i)} P(u(t)(i)) du(t)(i)} du(t)(i)$$

$$= \frac{1}{\int_0^{y(t)(i)} P(u(t)(i)) du(t)(i)} \times$$

$$\left\{ (y(t)(i))^2 \int_0^{y(t)(i)} P(u(t)(i)) du(t)(i) - \right.$$

$$2y(t)(i) \int_0^{y(t)(i)} u(t)(i) P(u(t)(i)) du(t)(i) +$$

$$\left. \int_0^{y(t)(i)} (u(t)(i))^2 P(u(t)(i)) du(t)(i) \right\}$$

$$= (y(t)(i))^2 - 2y(t)(i) \frac{\int_0^{y(t)(i)} u(t)(i) P(u(t)(i)) du(t)(i)}{\int_0^{y(t)(i)} P(u(t)(i)) du(t)(i)} +$$

$$\frac{\int_0^{y(t)(i)} (u(t)(i))^2 P(u(t)(i)) du(t)(i)}{\int_0^{y(t)(i)} P(u(t)(i)) du(t)(i)}$$

$$P(u(t)(i)) = \frac{1}{\sqrt{2\pi \Sigma'(i,i)}} e^{-\frac{1}{2\Sigma'(i,i)} (u(t)(i) - \mu'(i))^2} \tag{7}$$

In the above equations, $\xi(t)(i)$ denotes the ith component of the mean vector $\xi t$ in the tth frame, E[ ] denotes the mean value of values enclosed in square brackets ([ ]), x(t)(i) denotes the ith component of the power spectrum x(t) of the real voice in the tth frame, u(t)(i) denotes the ith component of the power spectrum of the ambient noise in the tth frame, and P(u(t)(i)) denotes the probability that the ith component of the power spectrum of the ambient noise in the tth frame is u(t)(i). Because the ambient noise is assumed to have a normal distribution, P(u(t)(i)) is given by equation (7) described above.

Ψ(t)(i,j) denotes a component in the ith row and the jth column of the variance Ψ(t) in the tth frame. V[ ] denotes the variance of values enclosed in square brackets ([ ]).

As described above, the feature distribution parameter calculation unit 12 determines, for each frame, the feature distribution parameters including the mean vector ξ and the variance matrix Ψ so as to represent the distribution of the real voice in the feature vector space (assuming that the distribution of the real voice in the feature vector space can be represented by a normal distribution).

Thereafter, the feature distribution parameter determined for each frame during the speech recognition interval is output to the speech recognition unit 6. For example, when a speech recognition interval includes T frames and feature distribution parameters for the respective T frames are given by z(t)={ξ(t), Ψ(t)} (t=1, 2, . . . , T), the feature distribution parameter (in the form of a series) Z={z(1), z(2), . . . , z(T)} is supplied from the feature distribution parameter calculation unit 12 to the speech recognition unit 6.

Referring again to FIG. 1, the speech recognition unit 6 classifies the feature distribution parameter Z received from the feature extractor 5 into one of a predetermined number (K) of acoustic models or one non-speech acoustic model (acoustic model representing a state in which no voice is present but only ambient noise is present), and the resultant model is output as a recognition result of the input voice. More specifically, the speech recognition unit 6 stores an identification function corresponding to a non-speech interval (that is, a function indicating whether a given feature parameter Z should be classified into the non-speech acoustic model) and identification functions respectively corresponding to a predetermined number (K) of words (that is, functions indicating which acoustic model a feature parameter Z should be classified into). The speech recognition unit 6 calculates the values of the identification functions corresponding to the respective acoustic models by employing, as the argument, the feature distribution parameter Z supplied from the feature extractor 5. The speech recognition unit 6 selects an acoustic model (a word or non-speech (noise)) having the greatest function value (that is, the greatest score) and outputs the selected acoustic model as the recognition result.

Figure 4:
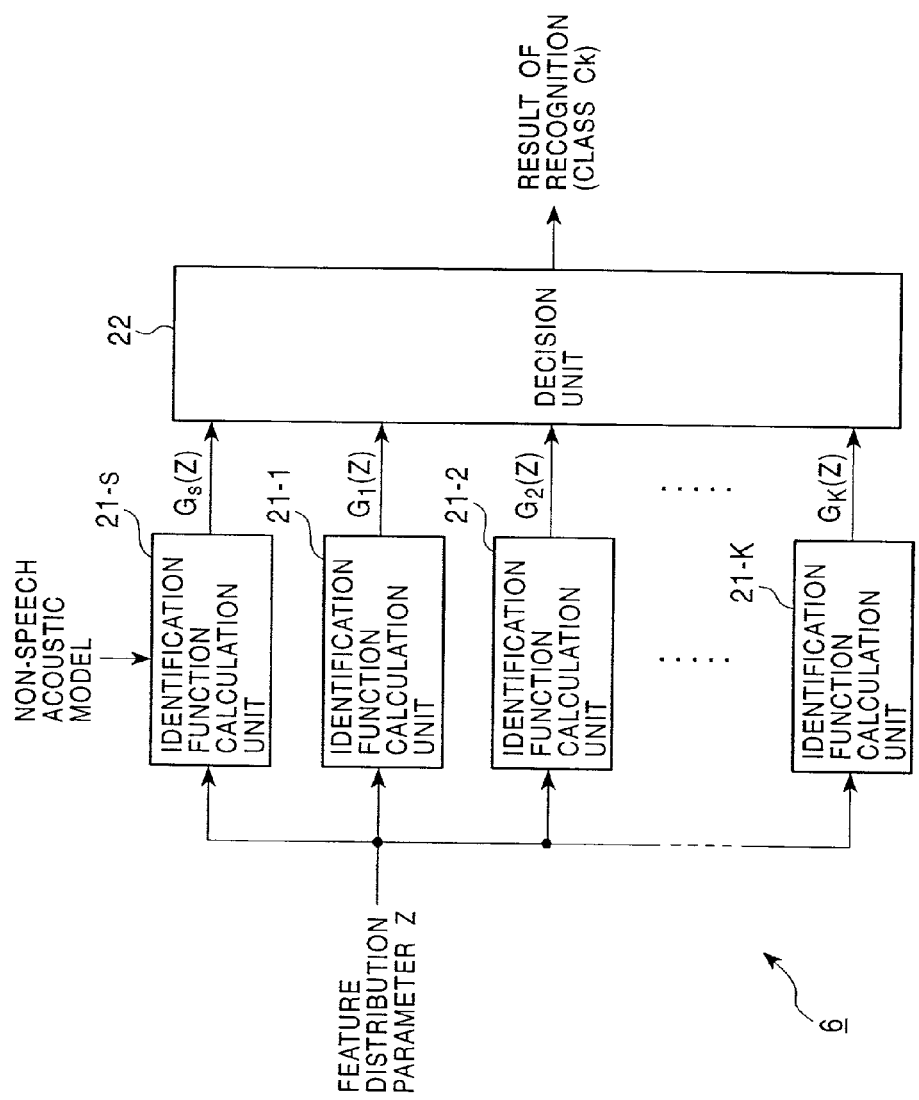
FIG. 4 is a block diagram illustrating an example of a detailed construction of a speech recognition unit 6 shown in FIG. 1.

FIG. 4 illustrates an example of a detailed construction of the speech recognition unit 6 shown in FIG. 1. The feature distribution parameter Z input from the feature distribution parameter calculation unit 12 of the feature extractor 5 is supplied to identification function calculation units 21-1 to 21-K and also to an identification function calculation unit 21-s. Each identification function calculation unit 21-k (k=1, 2, . . . , K) stores an identification function $G_k(Z)$ for discriminating a word corresponding to a kth acoustic model of the K acoustic models, and calculates the identification function $G_k(Z)$ by employing, as an argument, the feature parameter Z supplied from the feature extractor 5. The identification function calculation unit 21-s stores an identification function $G_s(Z)$ for discriminating a non-speech interval corresponding to the non-speech acoustic model and calculates the identification function $G_s(Z)$ by employing, as an argument, the feature parameter Z supplied from the feature extractor 5.

The speech recognition unit 6 discriminates (recognizes) a class indicating a word or a non-speech state, using, for example, a HMM (Hidden Markov Model) method.

Figure 5:
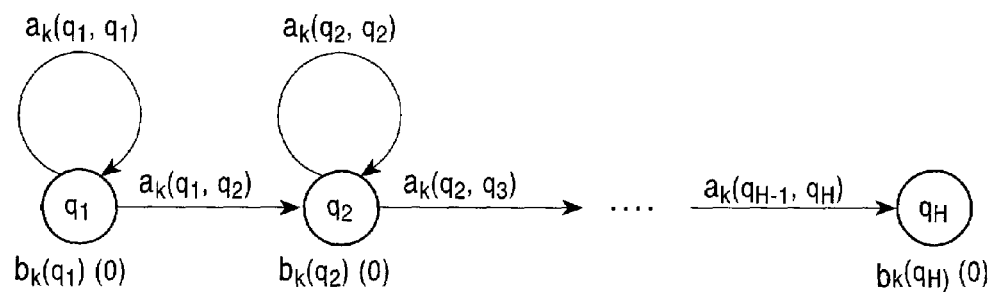
FIG. 5 is a diagram illustrating a hidden Markov model (HMM)

The HMM method is described below with reference to FIG. 5. In FIG. 5, the HMM includes H states $q_1$ to $q_H$ wherein state transition is allowed only from one state to that state itself or a right state immediately adjacent that state. The leftmost state $q_1$ is an initial state, and the rightmost state $q_H$ is an end state. Transition from the end state $q_H$ is not allowed. The model in which state transition to the left is forbidden is called a left-to-right model. In general, a left-to-right model is used in speech recognition.

Herein, a model for discriminating k classes of a HMM is referred to as a k-class model. A k-class model can be defined by a probability (initial state probability) $\pi_k(q_H)$ of being initially present in a state $q_H$, a probability (transition probability) $a_k(q_i, q_j)$ of transition from a state $q_i$ at a time (frame) t to a state $q_j$ at a time t+1, and a probability (output probability) $b_k(q_i)(O)$ for a state $q_i$ to output a feature vector O when a transition from that state $q_i$ occurs (wherein h=1, 2, . . . , H).

When a series of feature vectors $O_1, O_2, \ldots$ is given, a class of a model which gives the greatest probability (observation probability) that such a series of feature vectors is observed is employed as a recognition result of the series of feature vectors.

Herein, the observation probability is determined by the identification function $G_k(Z)$. The identification function $G_k(Z)$ indicates the probability that a (series of) feature distribution parameters $Z=\{z_1, z_2, \ldots, z_T\}$ is observed in an optimum state series (optimum manner in which state transitions occurs) for such a (series of) feature distribution parameter $Z=\{z_1, z_2, \ldots, z_T\}$, and is given the following equation (8).

$$G_k(Z) = \max_{q_1, q_2, \ldots, q_T} \pi_k(q_1) \cdot b'_k(q_1) \qquad (8)$$

$$(z_1) \cdot a_k(q_1, q_2) \cdot b'_k(q_2)(z_2) \ldots a_k(q_{T-1}, q_T) \cdot b'_k(q_T)(z_T)$$

where $b_k'(q_i)(z_j)$ denotes the output probability when the output has a distribution represented by $z_j$. Herein, the output probability $b_k(S)(O_t)$ of outputting a feature vector when a state transition occurs is represented by a normal distribution function on the assumption that there is no correlation among components in the feature vector space. In this case, when an input has a distribution represented by $z_t$, the output probability $b_k'(S)(z_t)$ can be determined using a probability density function $P_k^m(s)(x)$ defined by a mean vector $\mu_k(S)$ and a variance matrix $\Sigma_k(s)$ and also using a probability density function $P^f(t)(x)$ representing the feature vector (power spectrum in this case) x of a tth frame, in accordance with the following equation.

$$b'_k(s)(Z_t) = \int P^f(t)(x) P_k^m(s)(x) dx \qquad (9)$$

$$= \prod_{i=1}^{M} P(s)(i)(\xi(t)(i), \Psi(t)(i, i))$$

$$k = 1, 2, \ldots, K : s = q_1, q_2, \ldots, q_T : T = 1, 2, \ldots, T$$

In equation (9), the integration is performed over the entire M-dimensional feature vector space (power spectrum space in this case).

Furthermore, in equation (9), P(s)(i)(ξ(t)(i), Ψ(t)(i, i)) is given by the following equation.

$$P(s)(i)(\xi(t)(i), \Psi(t)(i, i)) = \frac{1}{\sqrt{2\pi\left(\sum_k (s)(i, i) + \Psi(t)(i, i)\right)}} e^{-\frac{(\mu_k(s)(i)-\xi(t)(i))^2}{2(\Sigma_k(s)(i,i)+\Psi(t)(i,i))}} \quad (10)$$

where $\mu_k(S)(i)$ denotes an ith component of the mean vector $\mu_k(s)$, and $\Sigma_k(S)(i, i)$ denotes a component in an ith row and ith column of the variance matrix $\Sigma_k(s)$. Thus, the output probability of a k-class model can be defined in the above-described manner.

As described above, the HMM is defined by the initial state probability $\pi_k(q_H)$, the transition probability $a_k(q_i, q_j)$, and the output probability $b_k(q_i)(O)$, and these probabilities are determined in advance from feature vectors calculated from learning voice data.

In the case where the HMM shown in FIG. 5 is employed, because transition starts from the leftmost state $q_1$, the initial state probability for the state $q_1$ is set to 1, and the initial state probabilities for the other states are set to 0. As can be seen from equations (9) and (10), if Ψ(t)(i, i) is set to 0, then the output probability becomes equal to that of continuous HMM in which the variance of feature vectors is not taken into account.

For a learning method of the HMM, for example, the Baum-Welch re-estimation method is known.

Referring again to FIG. 4, each identification function calculation unit 21-k (k=1, 2, . . . , K) stores an identification function $G_k(Z)$ given by equation (8) defined by initial state probabilities $\pi_k(q_H)$, transition probabilities $a_k(q_i, q_j)$, and output probabilities $b_k(q_i)(O)$, which are determined in advance by means of learning for a k-class model, and each identification function calculation unit 21-k calculates the identification function $G_k(Z)$ by employing, as the argument, the feature distribution parameter Z supplied from the feature extractor 2 and outputs the calculated function value $G_k(Z)$ (observation probability) to a decision unit 22. The identification function calculation unit 21-s stores an identification function $G_s(Z)$ which is similar to the identification function $G_k(Z)$ given by equation (8) and which is defined by initial state probabilities $\lambda_s(q_h)$, transition probabilities $a_s(q_i, q_j)$, and output probabilities $b_s(q_i)(O)$, which are supplied from the non-speech acoustic model correction unit 7. The identification function calculation unit 21-s calculates the identification function $G_s(Z)$ by employing, as the argument, the feature distribution parameter Z supplied from the feature extractor 2 and outputs the resultant function value $G_s(Z)$ (observation probability) to the decision unit 22.

The decision unit 22 determines which class (acoustic model) the feature distribution parameter Z, that is, the input voice belongs to, by applying, for example, a decision rule shown in equation (11) to the respective function values $G_k(Z)$ (including $G_s(Z)$) output from the identification function calculation unit 21-s and the identification function calculation units 21-1 to 21-k.

$$C(Z) = C_k, \text{ if } G_k(Z) = \max_i \{G_i(Z)\} \quad (11)$$

where C(Z) denotes a function which indicates a class to which the feature distribution parameter Z belongs. In equation (11), max on the right-hand side in the second equation denotes the maximum value of function values $G_i(Z)$ following max (where i=s, 1, 2, . . . , K).

If the decision unit 22 determines the class in accordance with equation (11), the decision unit 22 outputs the resultant class as a recognition result of the input voice.

Referring again to FIG. 1, the non-speech acoustic model correction unit 7 creates a new identification function $G_s(Z)$ for adapting the non-speech acoustic model stored in the speech recognition unit 6, on the basis of ambient noise represented by voice data which is extracted during the noise observation interval Tn, that is the second interval of the two noise observation intervals Tm and Tn, and which is supplied from the noise observation interval extractor 3. Using this new identification function $G_s(Z)$, the non-speech acoustic model correction unit 7 adapts the non-speech acoustic model stored in the speech recognition unit 6.

Figure 6:
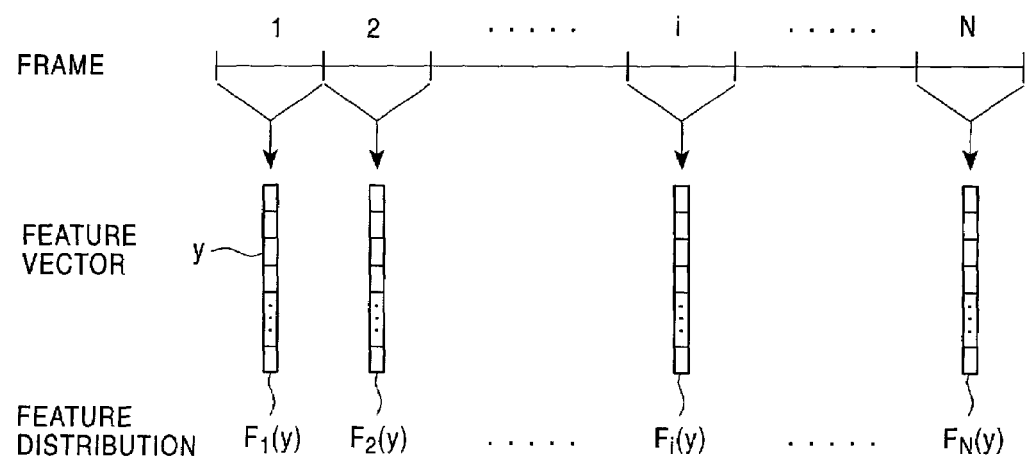
FIG. 6 is a diagram illustrating feature vectors y obtained during a noise observation interval Tn and also illustrating feature distributions $F_t(y)$.

More specifically, in the non-speech acoustic model correction unit 7, as shown in FIG. 6, a feature vector y is observed for each of N frames of the voice data (ambient noise) during the noise observation interval Tn supplied from the noise observation interval extractor 3, and a feature distribution such as that shown in the following equation is created in a similar manner as performed by the feature extractor 5.

$$\{F_1(y), F_2(y), \ldots, F_N(y)\} \quad (12)$$

Herein, the feature distribution $\{F_i(y), i=1, 2, \ldots, N\}$ is a probabilistic density function and will also be referred to as a non-speech feature distribution PDF.

Figure 7:
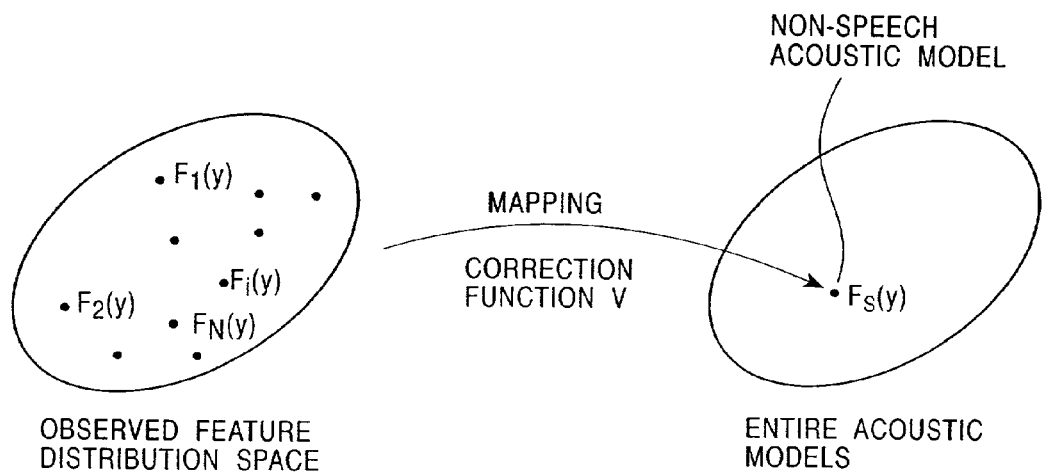
FIG. 7 is a diagram illustrating a manner in which a non-speech feature distribution PDF is mapped to a probability distribution $F_s(y)$ corresponding to a non-speech acoustic model.

The non-speech acoustic model correction unit 7 maps the non-speech feature distribution PDF to a probability distribution $F_s(y)$ corresponding to a non-speech acoustic model in accordance with the following equation, as shown in FIG. 7.

$$F_s(y)=V(F_1(y), F_2(y), \ldots, F_N(y)) \quad (13)$$

where V is a correction function (mapping function) which maps the non-speech feature distribution PDF $\{F_i(y), i=1, 2, \ldots, M\}$ to a non-speech acoustic model $F_s(X)$.

The non-speech acoustic model correction unit 7 updates the non-speech acoustic model stored in the speech recognition unit 6 using $F_s(y)$ so as to adapt the non-speech acoustic model.

Herein, if it is assumed that the probability distribution $F_s(y)$ representing the non-speech acoustic model is given by a normal distribution with a mean value of $\mu_s$ and a co-variance matrix of $\Sigma_s$, and if it is assumed that there is no correlation among components of the feature vector y of each frame, then the co-variance matrix $\Sigma_i$ of the non-speech feature distribution PDF $\{F_i(y), i=1, 2, \ldots, N\}$ becomes a diagonal matrix. However, it is required as a prerequisite that the co-variance matrix of the non-speech acoustic model be also a diagonal matrix. Hence, if there is no correlation among components of the feature vector y of each frame in the noise observation interval Tn, the non-speech feature distribution PDF $\{F_i(y), i=1, 2, \ldots, N\}$ becomes a normal distribution $N(\mu_i, \Sigma_i)$ having a mean value and a variance corresponding to each component. Herein, $\mu_i$ denotes the mean value of $F_i(y)$ and $\Sigma_i$ denotes a co-variance matrix of $F_i(y)$.

On the assumption described above, the non-speech acoustic model correction unit 7 adapts the non-speech acoustic model $F_s(y)$ using the non-speech feature distribution PDF by means of a most (maximum) likelihood method, a complex (mixed) statistic method, or a minimum distance-maximum separation theorem (minimum distance method).

Figure 8:
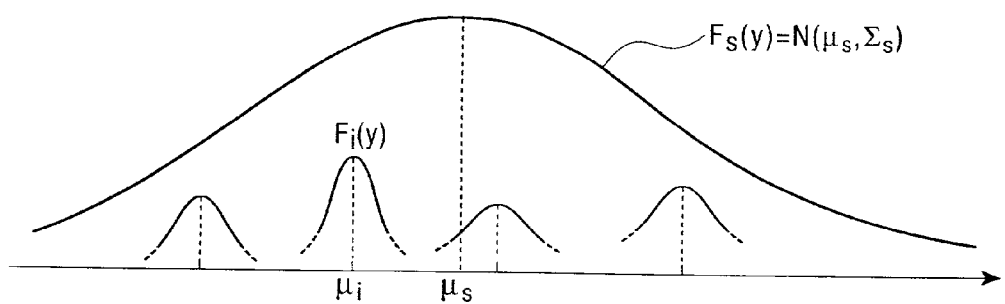
FIG. 8 is a diagram illustrating a manner in which a non-speech acoustic model is adapted by means of the most likelihood method.

When the non-speech acoustic model is adapted using the most likelihood method, a normal distribution $N(\mu_s, \Sigma_s)$ containing the non-speech feature distributions PDF $\{F_i(y), i=1, 2, \ldots, N\}$ is determined as a non-speech acoustic model, as shown in FIG. 8.

Figure 9:
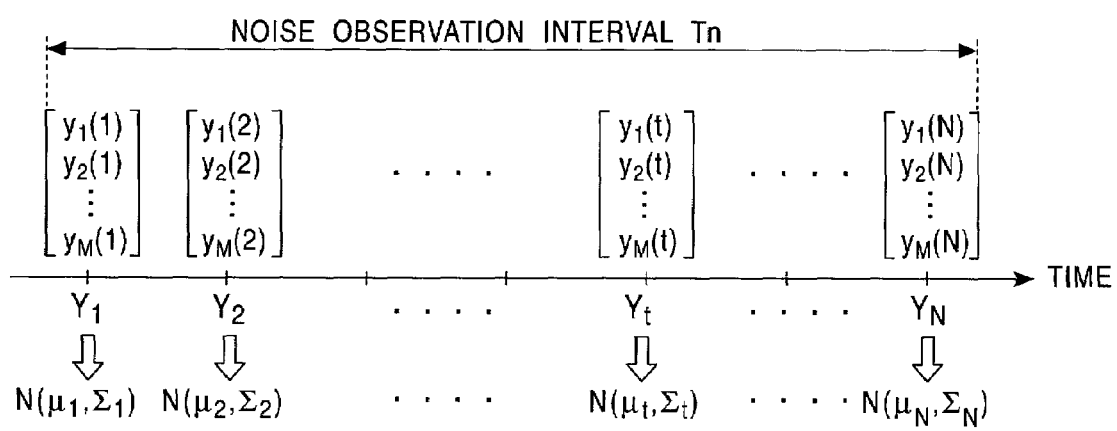
FIG. 9 is a diagram illustrating feature vectors obtained during a noise observation interval Tn and also illustrating feature distributions $Y_t$ in the form of normal distributions $N(\mu_t, \Sigma_t)$.

Herein, as shown in FIG. 9, M-dimensional feature vectors y obtained from a tth frame during the noise observation interval Tn are denoted by $(y_1(t), y_2(t), \ldots, y_M(t))$. Furthermore, a feature distribution obtained from the feature vectors $(y_1(t), y_2(t), \ldots, y_M(t))$ is denoted by $Y_t$, and a normal distribution representing the feature distribution is denoted by $N(\mu_t, \Sigma_t)$.

In the most likelihood method, a measure L indicating the degree to which non-speech feature distributions $Y_1, Y_2, \ldots, Y_N$ are observed is defined using the non-speech acoustic model $F_s(y)$ represented by the normal distribution $N(\mu_s, \Sigma_s)$, for example, as shown in the following equation.

$$L \triangleq \log \Pr(Y_1, Y_2, \ldots, Y_t, \ldots, Y_N | N(\mu_s, \Sigma_s)) \quad (14)$$

where log denotes a natural logarithm, and $\Pr(Y_2, Y_2, \ldots, Y_N | N(\mu_s, \Sigma_s))$ denotes the probability that a series of non-speech feature distributions $Y_1, Y_2, \ldots, Y_N$ is observed from the non-speech acoustic model $N(\mu_s, \Sigma_s)$ $(=F_s(y))$.

Herein, if it is assumed that the non-speech feature distributions $Y_1, Y_2, \ldots, Y_N$ are independent of each other, the measure L in equation (14) can be given by the following equation.

$$L = \log \prod_{t=1} \Pr\left(Y_t \mid N\left(\mu_s, \sum_s\right)\right) \quad (15)$$
$$= \sum_{t=1}^{N} \log \Pr\left(Y_t \mid N\left(\mu_s, \sum_s\right)\right)$$

When the measure L given by equation (15) (or equation (14)) has a large value, the possibility becomes high that the non-speech feature distributions $Y_1, Y_2, \ldots, Y_N$ are observed from the non-speech acoustic model. Therefore, the non-speech acoustic model can be updated (adapted) properly by employing a non-speech acoustic model $N(\mu_s, \Sigma_s)$ which gives a greatest (maximum) measure L represented by equation (15). Thus, it is needed to determine the mean value $\mu_s$ and the variance $\Sigma_s$ of the normal distribution $N(\mu_s, \Sigma_s)$ representing the non-speech acoustic model $F_s(y)$ so that the normal distribution defined by $\mu_s$ and $\Sigma_s$ results in the maximum measure L given by equation (15). If the measure L given by equation (14) is partially differentiated with respect to the mean value R and the variance $\Sigma_s$, respectively, the partial derivatives of the measure L become 0 at the values of the mean value $\mu_s$ and variance $\Sigma_s$ at which the measure L becomes maximum. Therefore, the values of the mean value $\mu_s$ and variance $\Sigma_s$ can be determined by solving equation (16).

$$\begin{cases} \dfrac{\partial L}{\partial \mu_s} = 0 \\ \dfrac{\partial L}{\partial \sum_s} = 0 \end{cases} \quad (16)$$

Herein, if the values of the mean value $\mu_s$ and the variance $\Sigma_s$ which satisfy the equation (16) are represented by equation (17), then the correction function (mapping function) V given by equation (13) is defined by the functions $V_\mu$ and $V_\Sigma$ in equation (17).

$$\begin{cases} \mu_s = V_\mu\left(\mu_t, \sum_t\right)\Big|_{t=1}^{N} \\ \sum_s = V_\Sigma\left(\mu_t, \sum_t\right)\Big|_{t=1}^{N} \end{cases} \quad (17)$$

To solve equation (16), the mean value $\mu_t$ and the variance (variance matrix) $\Sigma_t$ which define the non-speech feature distribution $N(\mu_t, \Sigma_t)$ $(=Y_t)$ are represented by the following equation (18).

$$\mu_t = \begin{bmatrix} \mu_1(t) \\ \mu_2(t) \\ \vdots \\ \mu_M(t) \end{bmatrix} \quad (18)$$

$$\sum_t = \begin{bmatrix} \sigma_{1,1}^2(t) & \sigma_{1,2}^2(t) \ldots \sigma_{1,M}^2(t) \\ \sigma_{2,1}^2(t) & \sigma_{2,2}^2(t) \ldots \sigma_{2,M}^2(t) \\ \ldots & \ldots \\ \sigma_{M,1}^2(t) & \sigma_{M,2}^2(t) \ldots \sigma_{M,M}^2(t) \end{bmatrix}$$

where t is an integer which can take a value of 1 to N, and $\sigma_{ij}^2(t)$ denotes a co-variance between i- and j-dimensional vectors.

As described earlier, because the components of the feature vectors of the respective frames are assumed to have no correlations with each other, the co-variance matrix $\Sigma_t$ of the non-speech feature distribution $N(\mu_t, \Sigma_t)$ becomes a diagonal matrix, and thus, of the components of $\Sigma_t$ in equation (18), those components (co-variance) with i and j which are different from each other become 0. Thus, the co-variance matrix $\Sigma_t$ can be represented by the following equation.

$$\sum_t = \begin{bmatrix} \sigma_{1,1}^2(t) & & & 0 \\ & \sigma_{2,2}^2(t) & & \\ & & \ddots & \\ 0 & & & \sigma_{M,M}^2(t) \end{bmatrix} \quad (19)$$

Similarly, the mean value $\mu_s$ and the variance (variance matrix) $\Sigma_s$ of the non-speech feature distribution $N(\mu_s, \Sigma_s)$ are represented by the following equation (20).

$$\mu_s = \begin{bmatrix} \mu_1(s) \\ \mu_2(s) \\ \vdots \\ \mu_M(s) \end{bmatrix} \quad (20)$$

$$\sum_s = \begin{bmatrix} \sigma_{11}^2(s) & \sigma_{12}^2(s) \ldots \sigma_{1,M}^2(s) \\ \sigma_{21}^2(s) & \sigma_{22}^2(s) \ldots \sigma_{2,M}^2(s) \\ \cdots & \cdots \\ \sigma_{M,1}^2(s) & \sigma_{M,2}^2(s) \ldots \sigma_{M,M}^2(s) \end{bmatrix}$$

Also in this case, the co-variance matrix $\Sigma_s$ of the non-speech feature distribution $N(\mu_s, \Sigma_s)$ is assumed to be a diagonal matrix as described earlier. Therefore, of the components of $\Sigma_s$ in equation (20), those components (co-variance) with i and j which are different from each other become 0. Thus, as in the case of equation (19), the co-variance matrix $\Sigma_s$ can be represented by the following equation.

$$\sum_s = \begin{bmatrix} \sigma_{11}^2(s) & & 0 \\ & \sigma_{22}^2(s) & \\ & & \ddots \\ 0 & & \sigma_{M,M}^2(s) \end{bmatrix} \quad (21)$$

Herein, for simplicity, some suffixes of the components of the co-variance $\Sigma_t$ in equation (19) are removed, and the mean value $\mu_t$ and the variance matrix $\Sigma_t$ which define the non-speech feature distribution $N(\mu_t, \Sigma_t)$ are represented by the following equation.

$$\begin{cases} \mu_t = \begin{bmatrix} \mu_1(t) \\ \vdots \\ \mu_M(t) \end{bmatrix} \\ \sum_t = \begin{pmatrix} \sigma_1^2(t) & & 0 \\ & \ddots & \\ 0 & & \sigma_M^2(t) \end{pmatrix} \end{cases} \quad (22)$$

where t=1, 2, . . . , N.

Similarly, some suffixes of the components of the co-variance $\Sigma_s$ in equation (21) are removed, and the mean value $\mu_s$ and the variance matrix $\Sigma_s$ which define the non-speech feature distribution $N(\mu_s, \Sigma_s)$ are represented by the following equation.

$$\begin{cases} \mu_s = \begin{bmatrix} \mu_1(s) \\ \vdots \\ \mu_M(s) \end{bmatrix} \\ \sum_s = \begin{pmatrix} \sigma_1^2(s) & & 0 \\ & \ddots & \\ 0 & & \sigma_M^2(s) \end{pmatrix} \end{cases} \quad (23)$$

Herein, if the non-speech feature distribution $Y_t(= N(\mu_t, \Sigma_t))$ in equation (15) is regarded as a probability density function defined by the mean value $\mu_t$ and the variance matrix $\Sigma_t$, and the non-speech feature distribution $N(\mu_s, \Sigma_s)$ is regarded as a probability density function defined by the mean value $\mu_s$ and the variance matrix $\Sigma_s$, then the measure L in equation (15) can be calculated as follows.

$$L = \sum_{t=1}^{N} \log \frac{1}{(2\pi)^{M/2} \left|\sum_t + \sum_s\right|^{1/2}} \cdot \quad (24)$$

$$\exp\left[-\frac{1}{2}(\mu_t - \mu_s)^T \left(\sum_t + \sum_s\right)^{-1} (\mu_t - \mu_s)\right]$$

$$= -\frac{1}{2} MN\log 2\pi - \frac{1}{2}\sum_t \left|\sum_t + \sum_s\right| -$$

$$\frac{1}{2}(\mu_t - \mu_s)^T \left(\sum_t + \sum_s\right)^{-1} (\mu_t - \mu_s)$$

$$= -\frac{1}{2} MN\log 2\pi - \frac{1}{2}\sum_{t=1}^{N}\sum_{k=1}^{M} \log(\sigma_k^2(t) + \sigma_k^2(s)) -$$

$$\frac{1}{2}\sum_{t=1}^{N}\sum_{k=1}^{M} \frac{(\mu_k(t) - \mu_k(s))^2}{\sigma_k^2(t) + \sigma_k^2(s)}$$

Herein, $(\Sigma_t + \Sigma_s)^{-1}$ in equation (24) can be given by the following equation.

$$\left(\sum_t + \sum_s\right)^{-1} = \begin{pmatrix} \frac{1}{\sigma_1^2(t) + \sigma_1^2(s)} & & 0 \\ & \ddots & \\ 0 & & \frac{1}{\sigma_M^2(t) + \sigma_N^2(s)} \end{pmatrix} \quad (25)$$

If the measure L represented by equation (24) is partially differentiated with respect to the mean value $\mu_s$ and the variance matrix $\Sigma_s$ as shown in FIG. (16), then the following equation is obtained.

$$\begin{cases} \dfrac{\partial L}{\partial \mu_k(s)} = -\sum_{t=1}^{N} \dfrac{\mu_k(t) - \mu_k(s)}{\sigma_k^2(t) + \sigma_k^2(s)} \\ \dfrac{\partial L}{\partial \sigma_k^2(s)} = -\dfrac{1}{2}\sum_{t=1}^{N} \dfrac{1}{\sigma_k^2(t) + \sigma_k^2(s)} + \dfrac{1}{2}\sum_{t=1}^{N} \dfrac{(\mu_k(t) - \mu_k(s))^2}{(\sigma_k^2(t) + \sigma_k^2(s))^2} \end{cases} \quad (26)$$

where k=1, 2, . . . , M.

From equation (26), the mean value $\mu_s$ ($\mu_s(s), \mu_s(s), \ldots, \mu_M(s)$)) and the variance $\Sigma_s$ ($\sigma_s^2(s), \sigma_2^2(s), \ldots, \sigma_M^2(s)$)) can be determined by solving the following equation.

$$\begin{cases} \sum_{t=1}^{N} \frac{\mu_k(t) - \mu_k(s)}{\sigma_k^2(t) + \sigma_k^2(s)} = 0 \\ \sum_{t=1}^{N} \left( \frac{1}{\sigma_k^2(t) + \sigma_k^2(s)} - \frac{(\mu_k(t) - \mu_k(s))^2}{(\sigma_k^2(t) + \sigma_k^2(s))^2} \right) = 0 \end{cases} \quad (27)$$

Hereinafter, suffixes of $\mu_k(t)$, $\mu_k(s)$, $\sigma_k^2(t)$, $\sigma_k^2(t)$ in equation (27) are represented in simplified fashions as shown below in equation (28).

$$\mu_t = \mu_k(t)$$

$$\mu_s = \mu_k(s)$$

$$V_t = \sigma_k^2(t)$$

$$V_s = \sigma_k^2(s) \quad (28)$$

Thus, equation (27) can be written as follows.

$$\begin{cases} \sum_{t=1}^{N} \frac{\mu_t - \mu_s}{v_t + v_s} = 0 \\ \sum_{t=1}^{N} \frac{1}{v_t + v_s} - \sum_{t} \frac{(\mu_t - \mu_s)^2}{(v_t + v_s)^2} = 0 \end{cases} \quad (29)$$

Equation (29) can be rewritten as follows.

$$\begin{cases} \mu_s = \dfrac{\sum_{t=1}^{N} \dfrac{\mu_t}{v_t + v_s}}{\sum_{t=1}^{N} \dfrac{1}{v_t + v_s}} \\ \sum_{t=1}^{N} \dfrac{1}{v_t + v_s} - \sum_{t=1}^{N} \dfrac{\left(\mu_t - \dfrac{\sum_{t=1}^{N} \dfrac{\mu_t}{v_t + v_s}}{\sum_{t=1}^{N} \dfrac{1}{v_t + v_s}}\right)^2}{(v_t + v_s)^2} = 0 \end{cases} \quad (30)$$

In equation (30), in order to obtain $\mu_s$, it is needed to determine $v_s$. $v_s$ may be determined, for example, using the Newton descent method or the Monte Carlo method.

Figure 10:
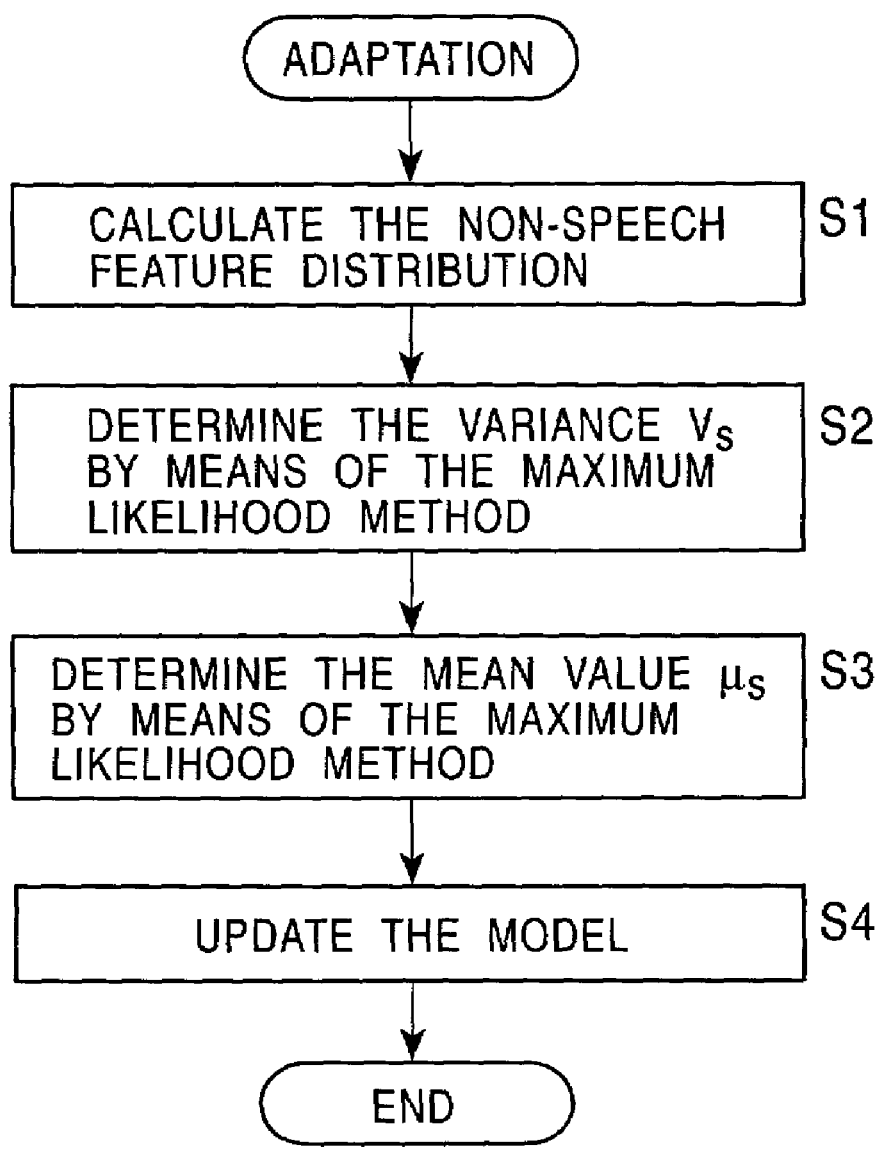
FIG. 10 is a flow chart illustrating a process of adapting a non-speech acoustic model by means of the most likelihood method.

In the case where the non-speech acoustic model is adapted by means of the most likelihood method described above, the non-speech acoustic model correction unit 7 performs a process (model adaptation process) according to, for example, a flow chart shown in FIG. 10.

In step S1, a non-speech feature distribution $F_i(y)$ (= $N(\mu_t, \Sigma_t)$) is determined from voice data (noise) during a noise observation interval Tn. Then in step S2, the variance $v_s$ in equation (30) is determined by means of the Newton descent method or the Monte Carlo method to obtain the value of the variance $v_s$ which maximizes the measure L represented by equation (15) indicating the degree to which the series of non-speech feature distributions is observed. Furthermore, in step S3, the mean value $\mu_s$ is determined using the variance $v_s$ determined in step S2 in accordance with equation (30). Thereafter, the process proceeds to step S4. In step S4, an identification function $G_s(Z)$ corresponding to a normal distribution $N(\mu_s, v_s)$ defined by the mean value $\mu_s$ determined in step S3 and the variance $v_s$ determined in step S2 is created. The identification function of the identification function calculation unit 21-$s$ in the speech recognition unit 6 (FIG. 4) is updated by the created identification function $G_s(Z)$, and the process is ended.

Figure 11:
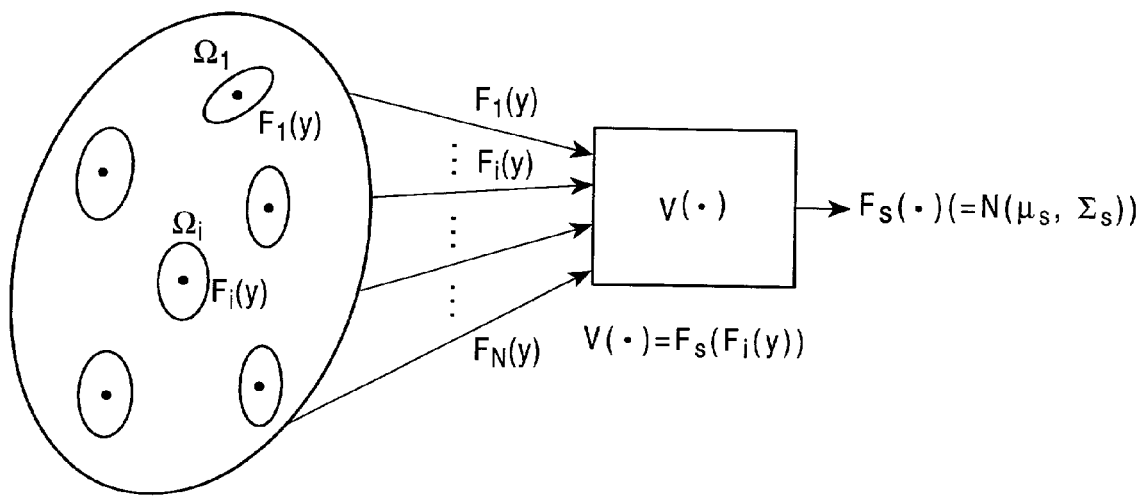
FIG. 11 is a diagram illustrating a manner in which a non-speech acoustic model is adapted by means of the complex statistic method.

In the case where the non-speech acoustic model is adapted by means of the complex statistics, a plurality of statistics, that is, a set of non-speech feature distributions $\{(F_i(y), i=1, 2, \ldots, N\}$ are combined as shown in FIG. 11, and the resultant complex statistic, that is, the normal distribution $N(\mu_s, \Sigma_s)$ obtained as a result is used to update the non-speech acoustic model $F_s(y)$.

When the complex statistic is used, the measure L indicating the degree to which non-speech feature distributions $F_1(y), F_2(y), \ldots, F_N(y)$ are observed in the noise observation interval $T_N$ is defined using the non-speech model $F_s(y)$ represented by the normal distribution $N(\mu_s, \Sigma_s)$ as shown in the following equation.

$$\begin{aligned} L &= \log \prod_{i}^{N} E(F_s(F_i(y))) \\ &= \sum_{i=1}^{N} \log \int_{\Omega_i} F_s(y) \cdot F_i(y) dy \\ &= \sum_{i=1}^{N} \left[ -\frac{(\mu_s - \mu_i)^2}{2(v_s + v_i)} - \frac{1}{2} \log(2\pi)^M (v_s + v_i) \right] \\ &= -\frac{1}{2} MN \log 2\pi - \frac{1}{2} \sum_{i=1}^{N} \log(v_s + v_i) - \frac{1}{2} \sum_{i=1}^{N} \frac{(\mu_s - \mu_i)^2}{v_s + v_i} \end{aligned} \quad (31)$$

In equation (31), $F_s(F_i(y))$ is a complex statistic, and $E( )$ represents an expected value of the variable enclosed in parentheses. The integration represented in the second row of equation (31) is performed over the entire feature vector space $\Omega_i$ (power spectrum space in this specific embodiment) of M-dimensional feature vectors y used to obtain the non-speech distribution $F_i(y)$. Furthermore, the modification from the second row to the third row in equation (31) can be accomplished by regarding the non-speech feature distribution $F_i(y)$ (=$N(\mu_t, \Sigma_t)$) as a probability density function defined by the mean value $\mu_t$ and the variance matrix $\Sigma_t$ and regarding the non-speech feature distribution $F_s(X)$ (= $N(\mu_s, \Sigma_s)$) as a probability density function defined by the mean value $\mu_s$ and the variance matrix $\Sigma_s$.

The updating (adapting) of the non-speech acoustic model can be performed employing a non-speech model $N(\mu_s, \Sigma_s)$ which results in the greatest (maximum) value for the measure L represented by equation (31). If the measure L given by equation (31) is partially differentiated with respect to the mean value $\mu_s$ and the variance $v_s$, respectively, the partial derivatives of the measure L become 0 at the values of the mean value $\mu_s$ and variance $v_s$ at which the measure L becomes maximum. Thus, the mean value $\mu_s$ and the variance $v_s$ (=$\sigma_s^2$) can be determined by solving equation (32).

$$\begin{cases} \dfrac{\partial L}{\partial \mu_s} = 0 \\ \dfrac{\partial L}{\partial v_s} = 0 \end{cases} \quad (32)$$

Substituting the measure L given by equation (31) into equation (32) yields equation (33).

$$\begin{cases} \sum_{i=1}^{N} \dfrac{\mu_s - \mu_i}{v_s + v_i} = 0 \\ \sum_{i=1}^{N} \left\{ \dfrac{1}{v_s + v_i} - \dfrac{(\mu_s - \mu_i)^2}{(v_s + v_i)^2} \right\} = 0 \end{cases} \quad (33)$$

Equation (33) can be rewritten as follows.

$$\begin{cases} \mu_s = \dfrac{\sum_{i=1}^{N} \dfrac{1}{v_s + v_i}}{\sum_{i=1}^{N} \dfrac{\mu_i}{v_s + v_i}} \\ v_s = \left\{ v_s : \sum_{i=1}^{N} \left( \dfrac{1}{v_s + v_i} - \dfrac{\left( \dfrac{\sum_{i=1}^{N} \frac{1}{v_s + v_i}}{\sum_{i=1}^{N} \frac{\mu_i}{v_s + v_i}} - \mu_i \right)^2}{(v_s + v_i)^2} \right) = 0 \right\} \end{cases} \quad (34)$$

In equation (34), in order to determine $\mu_s$, it is needed to determine $v_s$. $v_s$ may be determined, for example, using the Newton descent method or the Monte Carlo method, as in the case where the most likelihood method is employed.

Figure 12:
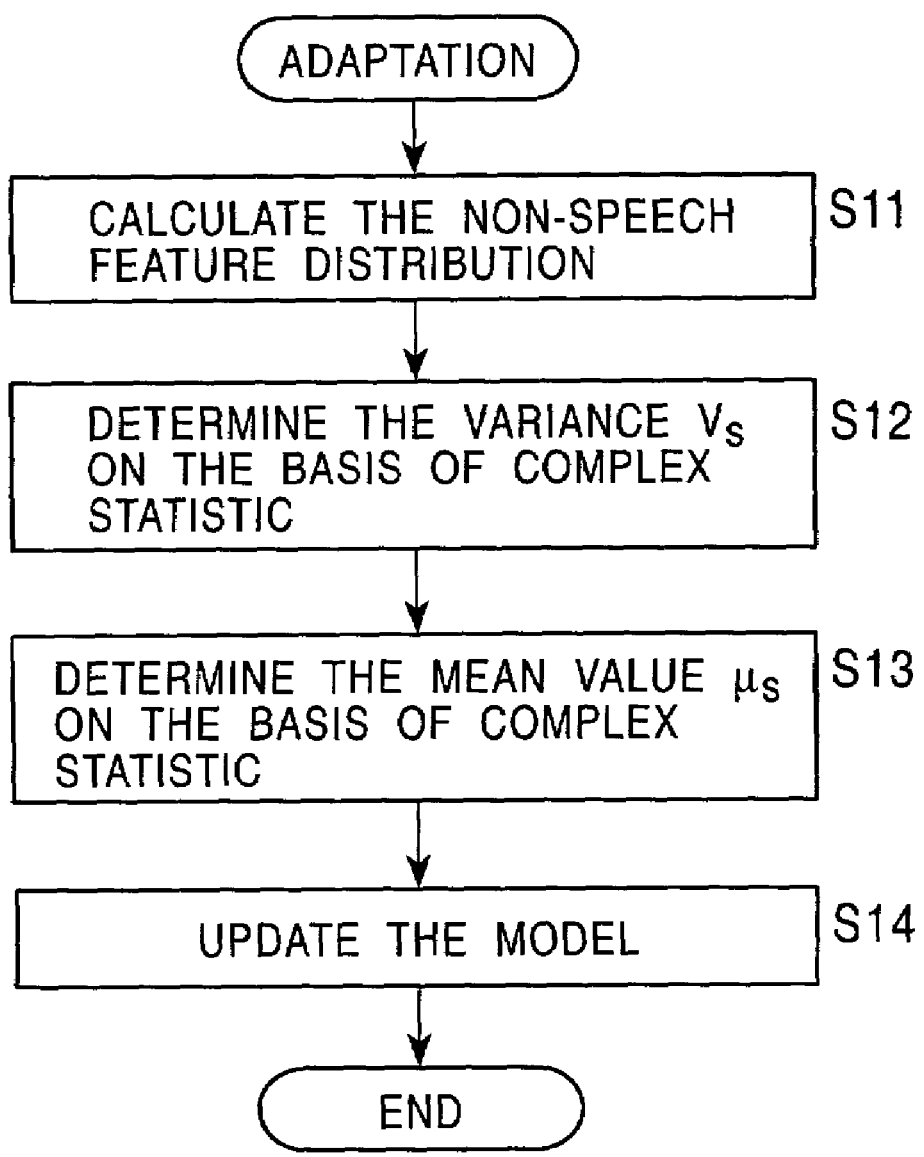
FIG. 12 is a flow chart illustrating a process of adapting a non-speech acoustic model by means of the complex statistic method.
Figure 13:
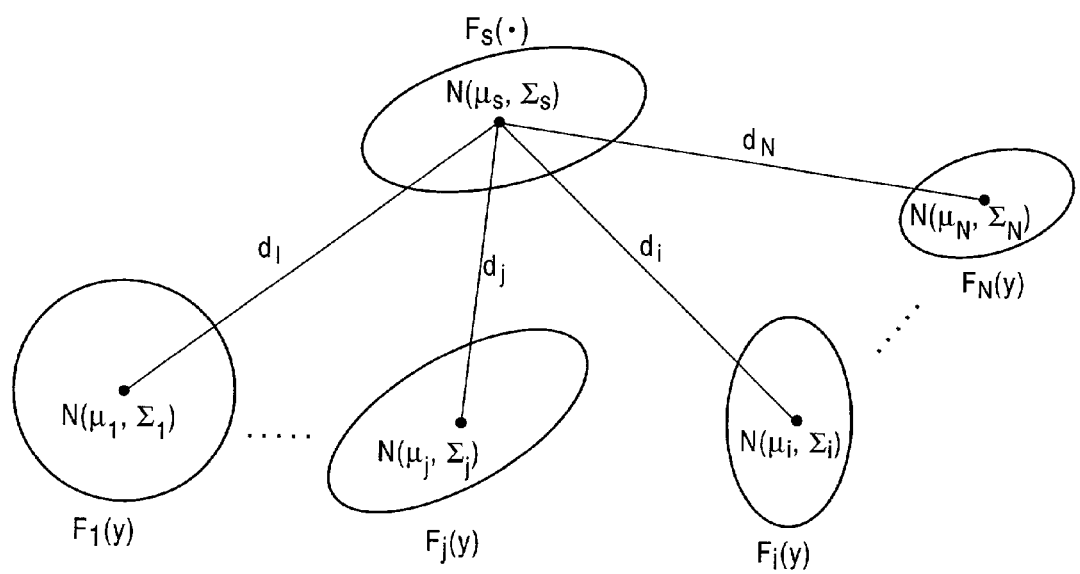
FIG. 13 is a diagram illustrating a manner in which a non-speech acoustic model is adapted by means of the minimum distance-maximum separation theorem.

In the case where the non-speech acoustic model is adapted by means of the complex statistic method described above, the non-speech acoustic model correction unit 7 performs a process (model adaptation process) according to, for example, a flow chart shown in FIG. 12.

In step S11, a non-speech feature distribution $F_t(y)$ (= $N(\mu_t, \Sigma_t)$) is determined from voice data (noise) during a noise observation interval Tn. Then in step S12, the variance $v_s$ in equation (34) is determined by means of the Newton descent method or the Monte Carlo method to obtain the value of the variance $v_s$ which maximizes the measure L represented by equation (31) indicating the degree to which the series of non-speech feature distributions is observed. Furthermore, in step S13, the mean value $\mu_s$ is determined using the variance $v_s$ determined in step S12 in accordance with equation (34). Thereafter, the process proceeds to step S14. In step S14, an identification function $G_s(Z)$ corresponding to a normal distribution $N(\mu_s, v_s)$ defined by the mean value $\mu_s$ determined in step S13 and the variance $v_s$ determined in step S12 is created. The identification function of the identification function calculation unit 21-s in the speech recognition unit 6 (FIG. 4) is updated by the created identification function $G_s(Z)$, and the process is ended.

In the case where the non-speech acoustic model is adapted by means of the minimum distance-maximum separation theorem, the non-speech acoustic model $F_s(y)$ is updated by a normal distribution $N(\mu_s, \Sigma_s)$ which minimizes the sum of distances $d_1, d_2, \ldots, d_N$ from the respective non-speech feature distributions in the form of normal distributions $F_1(y)$ (=$N(\mu_2, \Sigma_2)$), $F_2(y)$ (=$N(\mu_2, \Sigma_2)$), ..., $F_N(y)$ (=$N(\mu_N, \Sigma_N)$).

The distance $d_{ij}$ between a certain normal distribution $N(\mu_i, \Sigma_i)$ and another normal distribution $N(\mu_j, \Sigma_j)$ may be represented using, for example, a Bhattacharyya distance or a Mahalanobi distance.

When a Bhattacharyya distance is employed, the distance $d_{ij}$ between a normal distribution $N(\mu_i, \Sigma_i)$ and a normal distribution $N(\mu_j, \Sigma_j)$ is given by the following equation.

$$d_{ij} = \left\| N\left(\mu_i, \sum_i\right) - N\left(\mu_j, \sum_j\right) \right\| \quad (35)$$

$$= \dfrac{1}{8}(\mu_i - \mu_j)^T \left( \dfrac{\sum_i + \sum_j}{2} \right)^{-1} (\mu_i - \mu_j) +$$

$$\dfrac{1}{2} \log \dfrac{\left| \left(\sum_i + \sum_j\right)/2 \right|}{\left|\sum_i\right|^{1/2} \cdot \left|\sum_j\right|^{1/2}}$$

When a Mahalanobi distance is employed, the distance $d_{ij}$ between a normal distribution $N(\mu_i, \Sigma_i)$ and a normal distribution $N(\mu_j, \Sigma_j)$ is given by the following equation.

$$d_{ij} = \left\| N\left(\mu_i, \sum_i\right) - N\left(\mu_j, \sum_j\right) \right\| \quad (36)$$

$$= (\mu_i - \mu_j)^T \sum\nolimits^{-1} (\mu_i - \mu_j) \quad \left( \sum_i = \sum_j \right)$$

The Mahalanobi distance $d_{ij}$ given by equation (36) is determined on the assumption that two distributions the distance between which is to be determined have the same variance, that is, on the assumption that the co-variance matrix $\Sigma_i$ of the normal distribution $N(\mu_i, \Sigma_i)$ is identical to the co-variance matrix $\Sigma_j$ of the normal distribution $N(\mu_j, \Sigma_j)$ ($\Sigma_i = \Sigma_j = \Sigma$). Therefore, when the Mahalanobi distance is employed, a restriction is imposed upon the $N(\mu_i, \Sigma_i)$ representing the non-speech feature distribution $F_i(y)$.

In the present embodiment, for the above reason, the Bhattacharyya distance given by equation (35) is employed.

In the case where the minimum distance-maximum separation theorem is employed, the measure L indicating the degree to which non-speech feature distributions $Y_1(X)$, $Y_2(X), \ldots, Y_N(X)$ are observed during the noise observation interval Tn is defined using the non-speech acoustic model $F_s(y)$ represented by the normal distribution $N(\mu_s, \Sigma_s)$, for example, as shown in the following equation.

$$L \triangleq \sum_{i=1}^{N} \left\| N\left(\mu_i, \sum_i\right) - N\left(\mu_s, \sum_s\right) \right\| \quad (37)$$

$$= \sum_{i=1}^{N} \left\{ \dfrac{1}{4} \cdot \dfrac{(\mu_i - \mu_s)^2}{\sigma_i^2 + \sigma_s^2} + \dfrac{1}{2} \log \dfrac{M}{2} \cdot \dfrac{\sigma_i^2 + \sigma_s^2}{\sigma_i \sigma_s} \right\}$$

-continued $$= \frac{1}{4}\sum_{i=1}^{N}\left\{\frac{(\mu_i-\mu_s)^2}{\sigma_i^2+\sigma_s^2}+2\log\frac{\sigma_i^2+\sigma_s^2}{\sigma_i\sigma_s}\right\}+\frac{N}{2}\log\frac{M}{2}$$

When the measure L given by equation (37) becomes minimum, the distance between the normal distributions of the non-speech feature distribution and the non-speech acoustic model becomes minimum. Therefore, the non-speech acoustic model should be updated (adapted) by employing a non-speech acoustic model $N(\mu_s, \Sigma_s)$ which results in a smallest (minimum) value for the measure L represented by equation (37). If the measure L given by equation (31) is partially differentiated with respect to the mean value $\mu_s$ and the variance $\sigma_s^2$, respectively, the partial derivatives of the measure L become 0 at the values of the mean value $\mu_s$ and variance $\sigma_s^2$ at which the measure L becomes minimum. Therefore, the values of the mean value $\mu_s$ and variance $\sigma_s^2$ can be determined by solving equation (38).

$$\begin{cases}\frac{\partial L}{\partial \mu_s}=0\\ \frac{\partial L}{\partial \sigma_s^2}=0\end{cases} \quad (38)$$

Substituting the measure L given by equation (37) into equation (38) yields equation (39).

$$\begin{cases}\sum_{i=1}^{N}\frac{\mu_i-\mu_s}{\sigma_i^2+\sigma_s^2}=0\\ \sum_{i=1}^{N}\left\{\frac{(\mu_i-\mu_s)^2}{(\sigma_i^2+\sigma_s^2)^2}-\frac{\sigma_i^2-\sigma_s^2}{\sigma_s^2(\sigma_i^2+\sigma_s^2)}\right\}=0\end{cases} \quad (39)$$

Thus, from equation (39), the following equation (40) can be obtained.

$$\begin{cases}\mu_s=\dfrac{\sum_{i=1}^{N}\dfrac{\mu_i}{\sigma_i^2+\sigma_s^2}}{\sum_{i=1}^{N}\dfrac{1}{\sigma_i^2+\sigma_s^2}}\\ \sigma_s^2=\left\{\sigma_s^2:\sum_{i=1}^{N}\left[\dfrac{\left(\dfrac{\sum_{i=1}^{N}\dfrac{\mu_i}{\sigma_i^2+\sigma_s^2}}{\sum_{i=1}^{N}\dfrac{1}{\sigma_i^2+\sigma_s^2}}-\mu_i\right)^2}{(\sigma_i^2+\sigma_s^2)^2}-\dfrac{\sigma_i^2-\sigma_s^2}{\sigma_s^2(\sigma_i^2+\sigma_s^2)}\right]=0\right\}\end{cases} \quad (40)$$

In equation (40), in order to determine the mean value $\mu_s$, it is needed to determine the variance $\sigma_s^2$. $\sigma_s^2$ may be determined, for example, using the Newton descent method or the Monte Carlo method, as in the case where the most likelihood method is employed.

Figure 14:
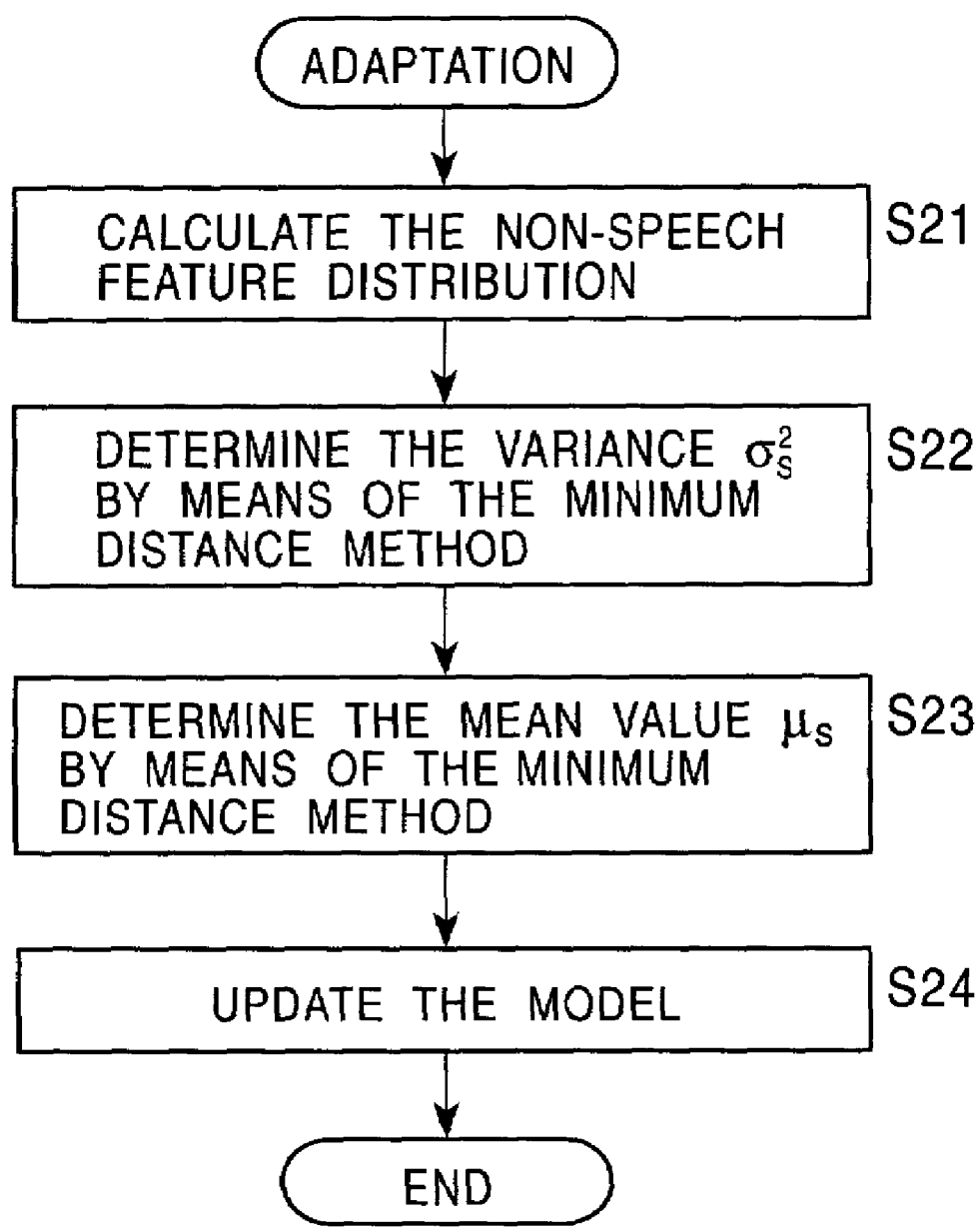
FIG. 14 is a flow chart illustrating a process of adapting a non-speech acoustic model by means of the minimum distance-maximum separation theorem.

In the case where the non-speech acoustic model is adapted by means of the minimum distance-maximum separation theorem, the non-speech acoustic model correction unit 7 performs a process (model adaptation process) according to, for example, a flow chart shown in FIG. 14.

In step S21, a non-speech feature distribution $F_t(y)$ (= $N(\mu_t, \Sigma_t)$) is determined from voice data (noise) during a noise observation interval Tn. Then in step S22, the variance $\sigma_s^2$ in equation (40) is determined by means of the Newton descent method or the Monte Carlo method to obtain the value thereof which maximizes the measure L represented by equation (37) indicating the degree to which the series of non-speech feature distributions is observed. Furthermore, in step S23, the mean value $\mu_s$ is determined using the variance $\sigma_s^2$ determined in step S22 in accordance with equation (40). Thereafter, the process proceeds to step S24. In step S24, an identification function $G_s(Z)$ corresponding to a normal distribution defined by the mean value $\mu_s$ determined in step S23 and the variance $\sigma_s^2$ determined in step S22 is created. The identification function of the identification function calculation unit 21-s in the speech recognition unit 6 (FIG. 4) is updated by the created identification function $G_s(Z)$, and the process is ended.

The operation of the speech recognition apparatus shown in FIG. 1 is described below.

Voice data (voice to be recognized, including ambient noise) is detected by a microphone 1 and input to a conversion-into-frame unit 2. The conversion-into-frame unit 2 converts the voice data into the form of frames. Frames of voice data are sequentially supplied, as an observation vector a, to the noise observation interval extractor 3 and the feature extractor 5. The noise observation interval extractor 3 extracts voice data (ambient noise) during noise observation intervals Tm and Tn immediately before a time $t_b$ at which the speech switch 4 is turned on. The extracted voice data is supplied to the feature extractor 5 and the non-speech acoustic model correction unit 7.

The non-speech acoustic model correction unit 7 updates (adapts) a non-speech acoustic model on the basis of the voice data representing the ambient noise during the noise observation intervals Tm and Tn by means of one of the most likelihood method, the complex statistic method, and the minimum distance-maximum separation theorem, described above. The resultant updated non-speech acoustic model is supplied to the speech recognition unit 6. The voice recognition unit 6 replaces an identification function corresponding to a non-speech acoustic model which has been maintained until that time with an identification function corresponding to the non-speech acoustic model supplied from the non-speech acoustic model correction unit 7 thereby adapting the non-speech acoustic model.

On the other hand, the feature extractor 5 performs acoustic analysis upon the voice data in the form of the observation vector a supplied from the conversion-into-frame unit 2 to determine the feature vector y thereof. The feature extractor 5 then calculates the feature distribution parameter Z representing the distribution in the feature vector space on the basis of the obtained feature vector y and the voice data (ambient noise) extracted during the noise observation interval Tm. The calculated feature distribution parameter Z is supplied to the speech recognition unit 6. The speech recognition unit 6 calculates the values of the identification functions of the acoustic models corresponding to a non-speech state and the predetermined number (K) of words, respectively, using the feature distribution parameter supplied from the feature extractor 5. The acoustic model corresponding to the function having the maximum value is output as the result of the speech recognition.

As described above, because the voice data given in the form of the observation vector a is converted into the feature distribution parameter Z representing the distribution in the feature vector space, that is, the space of feature values of the voice data, the feature distribution parameter is determined taking into account the distribution characteristic of noise included in the voice data Furthermore, because the identification function corresponding to the non-speech acoustic model for discriminating (detecting) a non-speech sound is updated on the basis of the voice data extracted during the noise observation interval Tn immediately before the start of the speech, a greater improvement in the speech recognition rate is achieved.

In the case where the non-speech acoustic model is not adapted, the speech recognition rate reduces greatly with increasing non-speech interval Ts from a time at which the speech switch 4 is turned on to a time at which speech is started (FIG. 2). In contrast, in the case where the non-speech acoustic model is adapted, the reduction in the speech recognition rate can be suppressed to a very low level even when the non-speech interval Ts becomes long thereby making it possible to achieve high recognition performance substantially regardless of the length of the non-speech interval Ts.

In the adaptation of the non-speech acoustic model using the non-speech feature distribution $F_i(y)$ (=$N(\mu_i, \sigma_i^2)$) by means of the most likelihood method, the complex statistic method, or the minimum distance-maximum separation theorem, a time series of non-speech feature distributions $F_1(y), F_2(y), \ldots, F_N(y)$ obtained from the respective N frames during the noise observation interval Tn (FIG. 2) are treated in the same manner.

However, strictly speaking, the ambient noise in the speech recognition interval is not identical to the ambient noise in the noise observation interval Tn immediately before the speech recognition interval. Besides, in general, the deviation of the ambient noise at a particular point of time in the noise observation interval Tn from the ambient noise in the speech recognition interval increases with the separation between that particular point of time and the speech recognition interval (start time $t_c$ of the speech recognition interval).

In view of the above, it is more desirable not to equally deal with the time series of non-speech feature distributions $F_1(y), F_2(y), \ldots, F_N(y)$ obtained from the respective N frames in the noise observation interval Tn (FIG. 2) but to deal with them such that a non-speech feature distribution nearer the speech recognition interval is weighted more heavily (a non-speech feature distribution farther away from the speech recognition interval is weighted more lightly) thereby making it possible to adapt (correct or update) the non-speech acoustic model so as to further improve the speech recognition accuracy.

For the above purpose, a freshness degree is introduced to represent the freshness (the proximity from the speech recognition interval) of the non-speech feature distributions $F_1(y), F_2(y), \ldots, F_N(y)$ obtained in the noise observation interval Tn, and the non-speech acoustic modes is adapted taking into account the freshness degree as described below.

Figure 15:
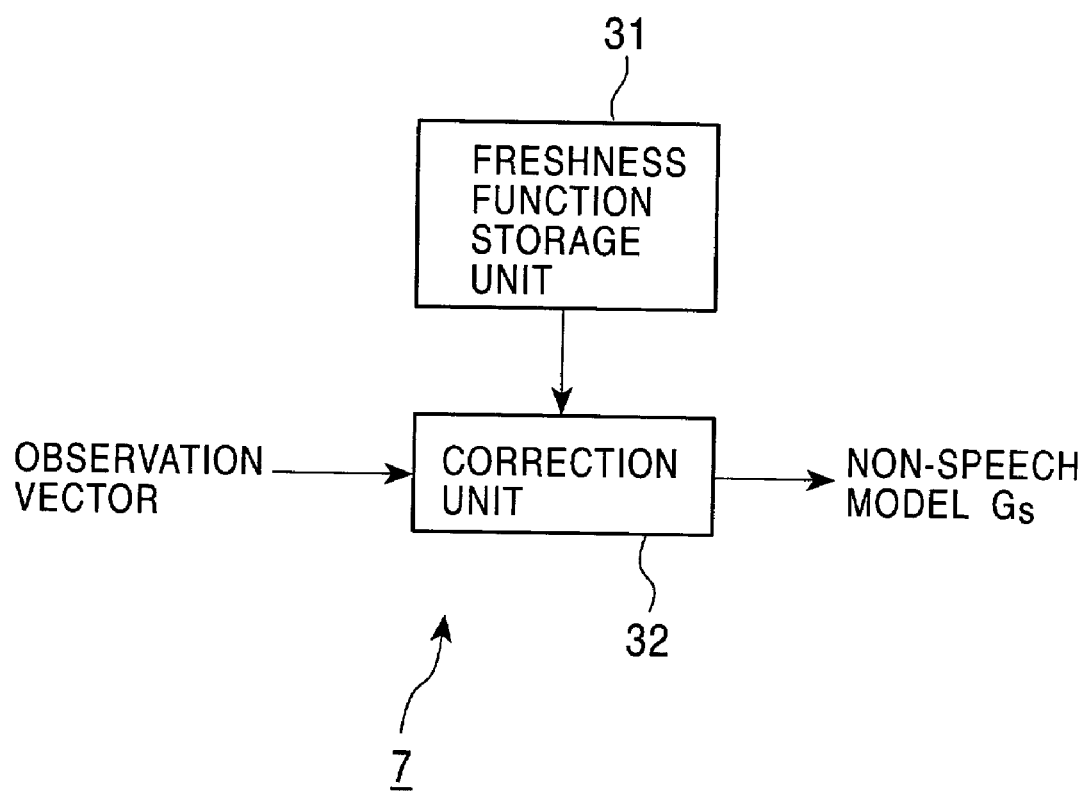
FIG. 15 is a block diagram illustrating an example of a construction of a non-speech acoustic model correction unit shown in FIG. 1.
Figure 16:
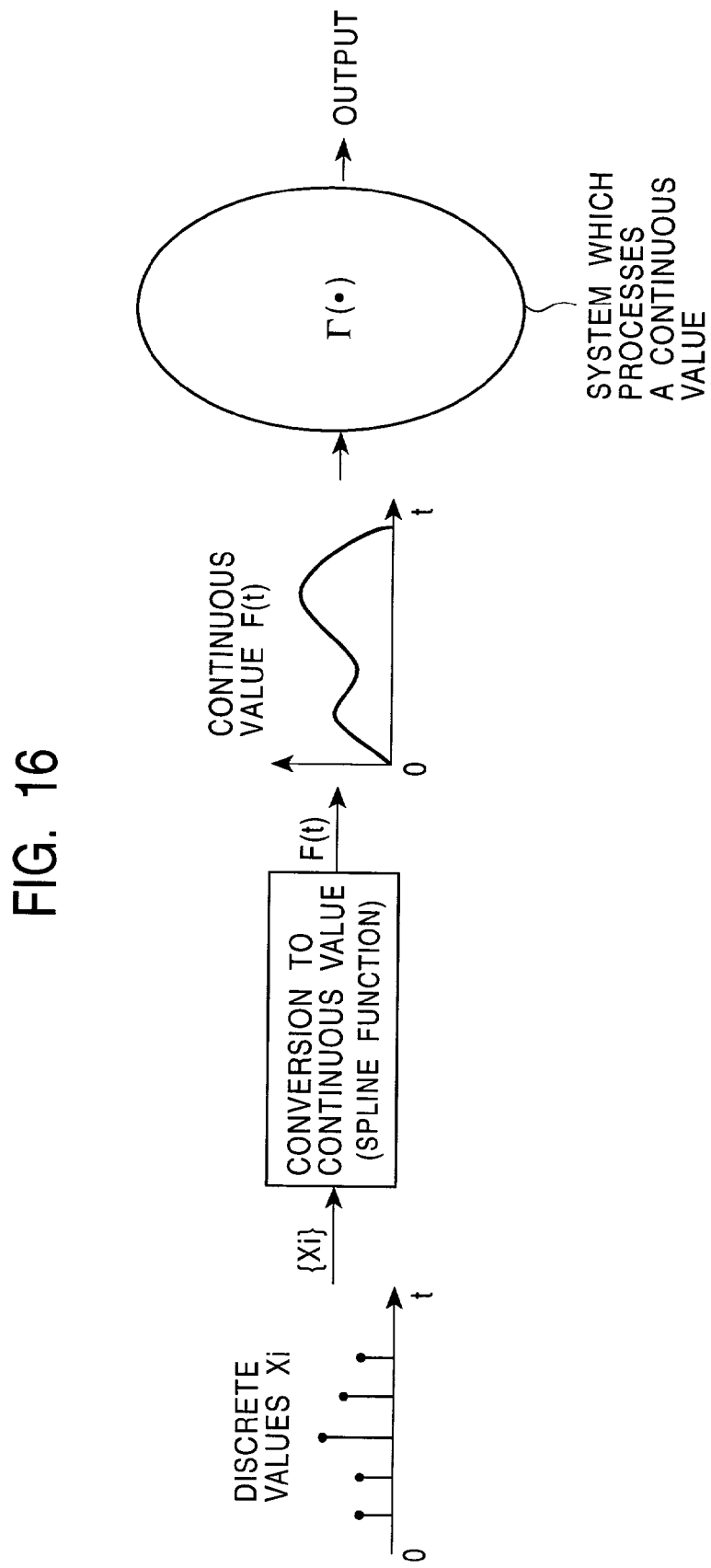
FIG. 16 is a diagram illustrating a manner in which discrete values are converted into a continuous value.

FIG. 15 illustrates an example of a manner in which the non-speech acoustic model correction unit 7 shown in FIG. 1 is constructed so as to adapt the non-speech acoustic model taking into account the freshness degree.

A freshness function storage unit 31 stores a freshness function representing the degree of freshness (or a parameter which defines the freshness function).

Voice data in the form of a series of observation vectors (N frames of voice data) extracted by the noise observation interval extractor 3 during the noise observation interval Tn is input to a correction unit 32. The correction unit 32 extracts non-speech feature distributions $F_1(y), F_2(y), \ldots, F_N(y)$ from the observation vectors and adapts the non-speech acoustic model on the basis of the extracted non-speech feature distributions and the freshness function stored in the freshness function storage unit 31.

Herein, the non-speech feature distributions $F_1(y), F_2(y), \ldots, F_N(y)$ have discrete values observed in the respective N frames during the noise observation interval Tn. If the non-speech acoustic model correction unit 7 is capable of dealing with discrete values, the non-speech feature distributions $F_1(y), F_2(y), \ldots, F_N(y)$ having discrete values can be directly used. However, in the case where the non-speech acoustic model correction unit 7 is designed to deal with a continuous value, it is required to convert the non-speech feature distributions $F_1(y), F_2(y), \ldots, F_N(y)$ having discrete values into continuous values using a discrete-to-continuous converter so that the non-speech acoustic model correction unit 7 can perform a process correctly. The conversion of the discrete values into a continuous value may be achieved, for example, by performing approximation using a spline function.

Herein, the discrete values refer to a finite number of values observed at discrete times in an observation interval having a finite length, and the continuous values refer to an infinite number of values observed at arbitrary times in the observation interval with a finite (or infinite) length, wherein the continuous values are represented by a certain function.

In the case where the non-speech feature distributions used to adapt the non-speech acoustic model are given in the form of discrete values, the refresh function is a function of discrete values. However, in the case where the non-speech feature distributions are given in the form of continuous values, the refresh function is a function of continuous values.

The refresh function and the adaptation of the non-speech acoustic model using the refresh function are described below.

The refresh function F(x) may be defined, for example, by equations (41) to (43).

$$F(x)=0 \text{ if } x \notin \Omega_{obs} \tag{41}$$

$$F(x_2) \geq F(x_1) \text{ if } x_2 \geq x_1 \tag{42}$$

$$\int_{\Omega_{obs}} F(x)dx = 1 \tag{43}$$

where $\Omega_{obs}$ denotes the observation interval of the non-speech feature distributions. In the present embodiment, $\Omega_{obs}$ corresponds to the noise observation interval Tn.

Figure 17:
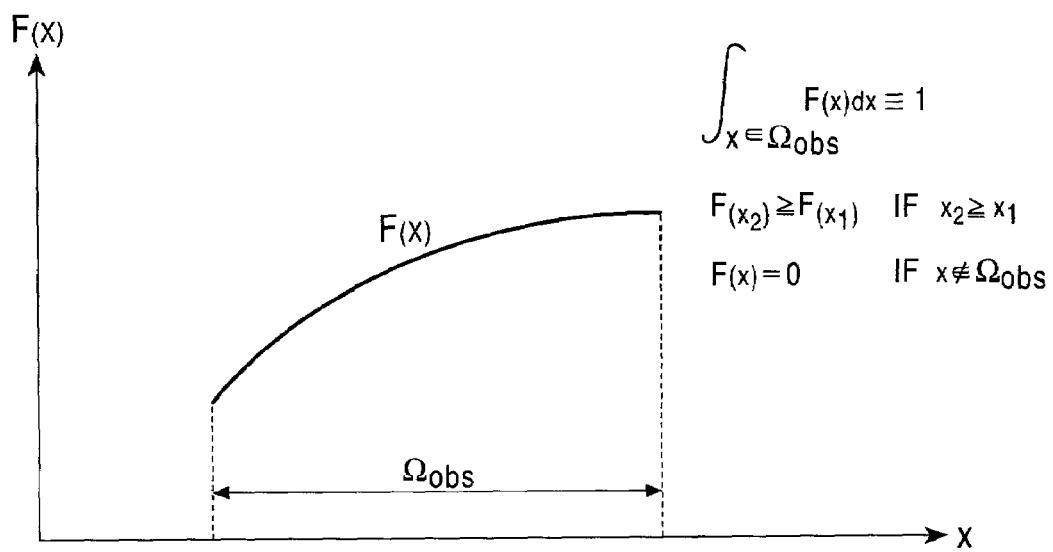
FIG. 17 is a graph illustrating a freshness function $F(x)$.

According to equation (41), the refresh function F(x) has a value of 0 for x outside the observation interval $\Omega_{obs}$. According to equation (42), the refresh function F(x) has a constant value or increases with a passage of time within the observation interval $\Omega_{obs}$. This means that the refresh function F(x) basically has a greater value for x closer to the speech recognition interval (FIG. 2). Furthermore, according to equation (43), when the refresh function F(x) is integrated over the observation interval $\Omega_{obs}$, the result must be equal to 1. FIG. 17 illustrates an example of the refresh function F(x) which satisfies the conditions given by equations (41) to (43).

In the present embodiment, the refresh function F(x) is used as a multiplier of the non-speech feature distributions, as will be described later with reference to equation (44). Therefore, when the refresh function F(x) has a positive or negative values the refresh function F(x) serves as a weight applied to a non-speech feature distribution. When the refresh function F(x) has a value equal to 0, the refresh function F(x) makes a non-speech feature distribution invalid when the non-speech feature distribution is multiplied by the refresh function F(x) so as to have no influence upon the adaptation of the non-speech acoustic model.

The correction unit 32 shown in FIG. 15 determines the adapted non-speech acoustic model F(y) using the refresh function F(x) described above and the non-speech feature distributions $F_1(y), F_2(y), \ldots, F_N(y)$, basically in accordance with equation (44).

$$F_s(y)=V(F(1)F_1(y), F(2)F_2(y), \ldots, F(N)F_N(y)) \quad (44)$$

According to equation (44), the non-speech feature distributions are dealt with in the adaptation of the non-speech acoustic model such that a non-speech feature distribution closer to the speech recognition interval is weighted more heavily, thereby achieving a further improvement in the speech recognition accuracy.

The speech recognition apparatus according to the present invention has been described above. Such a speech recognition apparatus may be used, for example, in a car navigation apparatus capable of accepting a command issued via a voice and also other various types of apparatuses.

In the above-described embodiments, a feature distribution parameter is determined taking into account the distribution characteristic of noise. The noise may include not only ambient noise in an environment where speech is made but also other noise such as that arising from the characteristic of a communication line such as a telephone line via which voice to be recognized is transmitted.

The present invention can be applied not only to speech recognition but also to another pattern recognition such as image recognition.

Although in the above-described embodiments, the non-speech acoustic model is adapted using a non-speech feature distribution represented in a feature space, the non-speech acoustic model may also be adapted using a feature value of noise represented as a point in the feature space.

Although in the above-described embodiments, the non-speech acoustic model representing noise is adapted, the adaptation method according to the present invention may also be used to adapt another acoustic model.

The processing sequence described above may be executed by hardware or software. When the processes are performed by software, a software program is installed on a general-purpose computer or the like.

Figure 18:
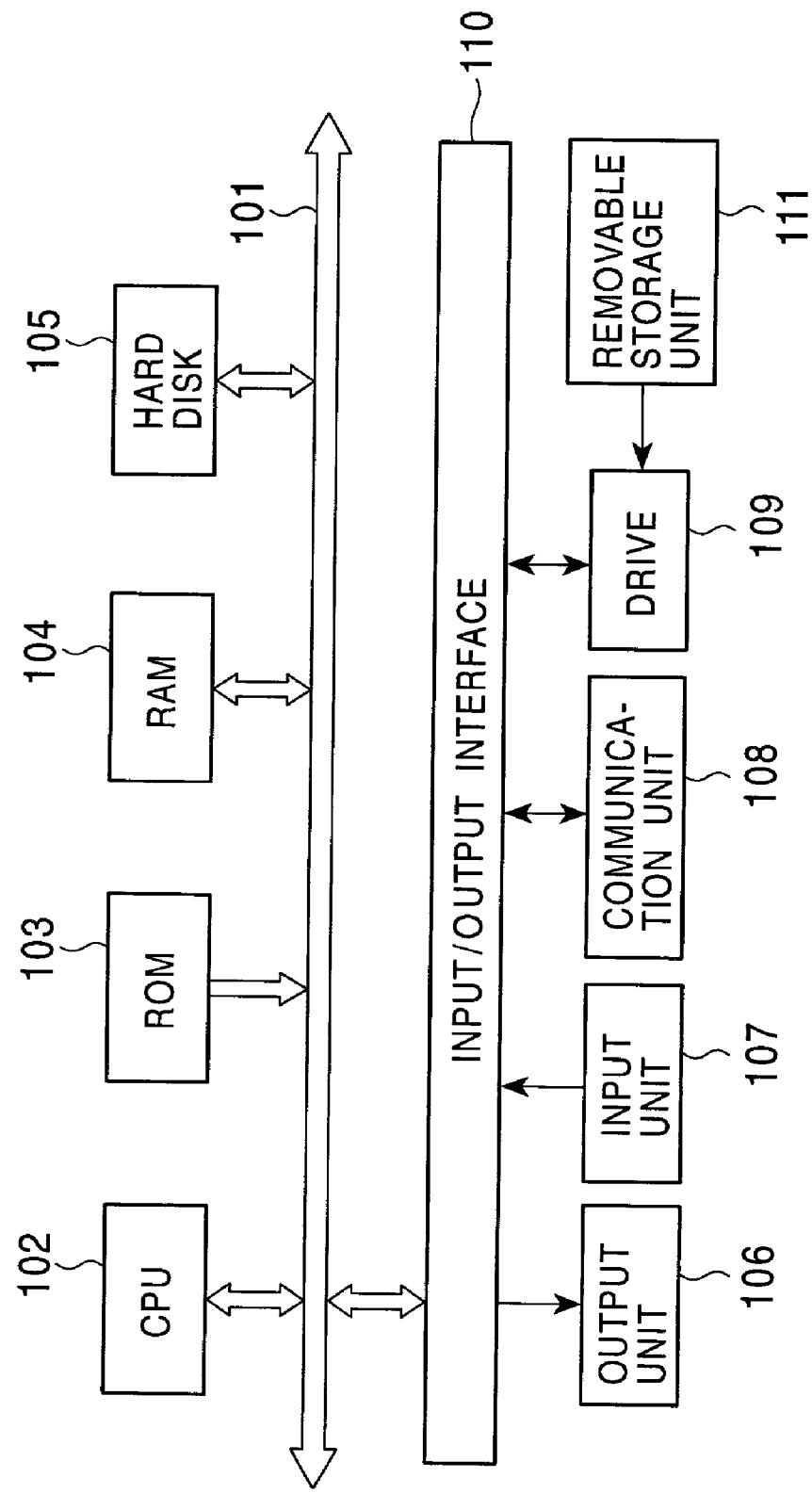
FIG. 18 is a block diagram illustrating an embodiment of a computer according to the present invention.

FIG. 18 illustrates an embodiment of the invention in which a program used to execute the processes described above is installed on a computer.

The program may be stored, in advance, on a hard disk 105 serving as a storage medium or in a ROM 103 which are disposed inside the computer.

Alternatively, the program may be stored (recorded) temporarily or permanently on a removable storage medium such as a floppy disk, a CD-ROM (Compact Disc Read Only Memory), a MO (Magnetooptical) disk, a DVD (Digital Versatile Disc), a magnetic disk, or a semiconductor memory. Such a removable recording medium 111 may be provided in the form of so-called package software.

Instead of installing the program from the removable storage medium 111 onto the computer, the program may also be transferred to the computer from a download site via a digital broadcasting satellite by means of radio transmission or via a network such as a LAN (Local Area Network) or the Internet by means of wire communication. In this case, the computer receives, using a communication unit 108, the program transmitted in such a manner and installed the program on the hard disk 105 disposed in the computer.

The computer includes therein a CPU (Central Processing Unit) 102. When a user inputs a command by operating an input device 107 such as a keyboard or a mouse, the command is transferred to the CPU 102 via the input/output interface 110. In accordance with the command, the CPU 102 executes a program stored in the ROM (Read Only Memory) 103. Alternatively, the CPU 102 may execute a program loaded in a RAM (Random Access Memory) 104 wherein the program may be loaded into the RAM 104 by transferring a program stored on the hard disk 105 into the RAM 104, or transferring a program which has been installed on the hard disk 105 after being received from a satellite or a network via the communication unit 108, or transferring a program which has been installed on the hard disk 105 after being read from a removable recording medium 111 loaded on a drive 109, whereby the CPU 102 executes the process represented by the above-described block diagram. The CPU 102 outputs the result of the process, as required, to an output device 106 such as a LCD (Liquid Crystal Display) or a loudspeaker via an input/output interface 110. The result of the process may also be transmitted via the communication unit 108 or may be stored on the hard disk 105.

In the present invention, the processing steps described in the program to be executed by a computer to perform various kinds of processing are not necessarily required to be executed in time sequence according to the order described in the flow chart. Instead, the processing steps may be performed in parallel or separately (by means of parallel processing or object processing).

The program may be executed either by a single computer or by a plurality of computers in a distributed fashion. The program may be transferred to a computer at a remote location and may be executed thereby.

In the model adaptation apparatus, the model adaptation method, the store medium, and the pattern recognition apparatus, according to the present invention, as described above, input data corresponding to a predetermined model observed during a predetermined interval is extracted and output as extracted data. The predetermined model is adapted using the data extracted during the predetermined interval by means of one of the most likelihood method, the complex statistic method, and the minimum distance-maximum separation theorem, thereby making it possible to perform pattern recognition using the adapted model and thus high recognition performance can be achieved.

What is claimed is:

1. A model adaptation apparatus for adapting a model used in pattern recognition in which input data in the form of a time series is classified into one of a predetermined number of models, said apparatus comprising:
    data extraction means for extracting input data corresponding to a predetermined model, observed during a predetermined interval, and then outputting the extracted data; and
    a model adaptation means for adapting said predetermined model using said data extracted during said predetermined interval by means of one of the maximum likelihood method, the mixed statistic method, and the minimum distance-maximum separation theorem;
    wherein said model adaptation means adapts an acoustic model for ambient noise during a noise observation interval that ends when a speech switch is turned on when a user starts speech;
    wherein said noise observation interval has a first sub-interval and a second sub-interval beginning when the first sub-interval ends,
    said data extraction means extracts a feature distribution corresponding to ambient noise during said first sub-interval of a noise observation interval, and
    said model adaptation means adapts said acoustic model for ambient noise during said second sub-interval.

* * * * *